(12) United States Patent
Rashid et al.

(10) Patent No.: US 8,670,966 B2
(45) Date of Patent: Mar. 11, 2014

(54) METHODS AND SYSTEMS FOR PERFORMING OILFIELD PRODUCTION OPERATIONS

(75) Inventors: Kashif Rashid, Hounslow (GB); Daniel Colin-Nesbitt Lucas-Clements, Faringdon (GB); Aron Edward Hallquist, Houston, TX (US); Michael Huber, Vienna (AT); Trevor Graham Tonkin, Faringdon (GB); Andrew Michael Shand, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 562 days.

(21) Appl. No.: 12/534,962

(22) Filed: Aug. 4, 2009

(65) Prior Publication Data

US 2010/0042458 A1 Feb. 18, 2010

Related U.S. Application Data

(60) Provisional application No. 61/086,126, filed on Aug. 4, 2008.

(51) Int. Cl.
*G06G 7/48* (2006.01)
*G06G 7/50* (2006.01)
*G01N 15/08* (2006.01)
*E21B 43/00* (2006.01)

(52) U.S. Cl.
USPC ...... 703/10; 703/9; 702/12; 702/13; 166/267; 166/245

(58) Field of Classification Search
USPC .................................. 703/9–10; 702/12–13
See application file for complete search history.

(56) References Cited

U.S. PATENT DOCUMENTS

| 5,176,164 A | 1/1993 | Boyle |
| 5,782,261 A | 7/1998 | Becker |

(Continued)

FOREIGN PATENT DOCUMENTS

| GB | 2457395 A | 8/2009 |
| RU | 2081301 C1 | 6/1997 |

(Continued)

OTHER PUBLICATIONS

Integration of a Field Surface and Production Network With a Reservoir Simulator ; Gokhan Hepguler et al, SPE 1997 pp. 88-93; DOI: 10.2118/38937-PA.*

(Continued)

*Primary Examiner* — Akash Saxena
(74) *Attorney, Agent, or Firm* — Colin L. Wier; Rodney Warfford; Alec J. McGinn

(57) ABSTRACT

Methods and systems for performing well network production optimizations are described. For example, in one embodiment, a method of allocating an applied resource throughout a well network includes receiving topological data into an analytical model of a well network having one or more wells. The topological data includes a plurality of performance curves that relate well performance to one or more levels of an applied resource. The method also includes determining an optimum allocation of the applied resource using the analytical model to maximize an operating parameter of the well network, including converting a portion the analytical model having one or more wells and a linear inequality relationship to a modified portion having a single variable and a linear equality constraint.

14 Claims, 19 Drawing Sheets

(56) References Cited

U.S. PATENT DOCUMENTS

| | | | |
|---|---|---|---|
| 5,871,048 A | 2/1999 | Tokar | |
| 5,992,519 A | 11/1999 | Ramakrishnan | |
| 6,178,815 B1 | 1/2001 | Felling | |
| 6,206,645 B1 | 3/2001 | Pringle | |
| 6,229,308 B1* | 5/2001 | Freedman | 324/303 |
| 6,236,894 B1* | 5/2001 | Stoisits et al. | 700/28 |
| 6,313,837 B1 | 11/2001 | Assa | |
| 6,507,774 B1* | 1/2003 | Reifman et al. | 700/274 |
| 6,775,578 B2 | 8/2004 | Couet | |
| 6,840,317 B2 | 1/2005 | Hirsch | |
| 6,980,940 B1 | 12/2005 | Gurpinar | |
| 7,114,557 B2 | 10/2006 | Cudmore | |
| 7,172,020 B2* | 2/2007 | Tseytlin | 166/250.07 |
| 7,248,259 B2 | 7/2007 | Fremming | |
| 7,561,928 B2* | 7/2009 | Peureux et al. | 703/9 |
| 7,627,461 B2* | 12/2009 | Guyaguler et al. | 703/10 |
| 7,752,023 B2* | 7/2010 | Middya | 703/10 |
| 7,904,280 B2* | 3/2011 | Wood | 703/2 |
| 7,953,584 B2* | 5/2011 | Rashid | 703/10 |
| 8,078,444 B2* | 12/2011 | Rashid et al. | 703/10 |
| 2002/0165671 A1* | 11/2002 | Middya | 702/12 |
| 2003/0078850 A1* | 4/2003 | Hartman et al. | 705/26 |
| 2003/0094281 A1 | 5/2003 | Tubel | |
| 2003/0216897 A1 | 11/2003 | Endres | |
| 2004/0104027 A1 | 6/2004 | Rossi | |
| 2004/0220846 A1 | 11/2004 | Cullick | |
| 2005/0149264 A1 | 7/2005 | Tarvin | |
| 2005/0149307 A1 | 7/2005 | Gurpinar | |
| 2006/0076140 A1 | 4/2006 | Rouen | |
| 2006/0197759 A1 | 9/2006 | Fremming | |
| 2007/0112547 A1 | 5/2007 | Ghorayeb | |
| 2007/0198223 A1* | 8/2007 | Ella et al. | 702/188 |
| 2007/0239402 A1 | 10/2007 | Scott | |
| 2007/0246222 A1 | 10/2007 | Ramachandran | |
| 2008/0010245 A1* | 1/2008 | Kim et al. | 707/2 |
| 2008/0065363 A1* | 3/2008 | Middya | 703/10 |
| 2008/0140369 A1* | 6/2008 | Rashid et al. | 703/10 |
| 2008/0154564 A1* | 6/2008 | Rashid | 703/10 |
| 2008/0234939 A1* | 9/2008 | Foot et al. | 702/12 |
| 2008/0262737 A1* | 10/2008 | Thigpen et al. | 702/9 |
| 2009/0166033 A1* | 7/2009 | Brouwer et al. | 703/2 |
| 2009/0198478 A1 | 8/2009 | Cuevas | |
| 2009/0300134 A1* | 12/2009 | Smith et al. | 718/100 |

FOREIGN PATENT DOCUMENTS

| | | |
|---|---|---|
| SU | 1794179 A3 | 2/1993 |
| WO | 9964896 | 12/1999 |
| WO | 2004049216 | 6/2004 |
| WO | WO/2008/070864 * | 6/2008 |

OTHER PUBLICATIONS

Opportunities and challenges of using sequential quadratic programming (SQP) for optimization of petroleum production networks; Marta Duenas Diez et al; European Symposium on Computer Aided Process Engineering; 2005; pp. 169-174.*

Schlumberger, "PIPESIM, Pipeline and facilities design and analysis", Schlumberger Information Solutions Brochure No. SIS_02_0231_0, Jan. 2003, pp. 1-4.

Schlumberger, "PIPESIM, Well design and production performance analysis", Schlumberger Information Solutions Brochure No. SIS_02_0232_0, Jan. 2003, pp. 1-4.

Schlumberger, "Avocet Gas Lift Optimization Module", Schlumberger Brochure No. 08-IS-298, 2008, pp. 1-2.

Schlumberger, "Avocet, Integrated Asset Modeler", Schlumberger Brochure No. 05-IS-246, 2005, pp. 1-6.

Petroleum Experts, "IPM-GAP, Prosper, MBAL, PVTP, Reveal, Resolve, Openserver", 2008, pp. 1-27.

Handley-Schachler, et al., "New mathematical techniques for the optimsation of oil & gas production systems", SPE European Petroleum Conference, Paris, France, Oct. 24-25, 2000, SPE 65161.

Edwards, et al., "A Gas-Lift Optimization and Allocation Model for Manifolded Subsea Wells", SPE 20979—European Petroleum Conference, the Hague, Netherlands, Oct. 21-24, 1990, 11 pages.

* cited by examiner

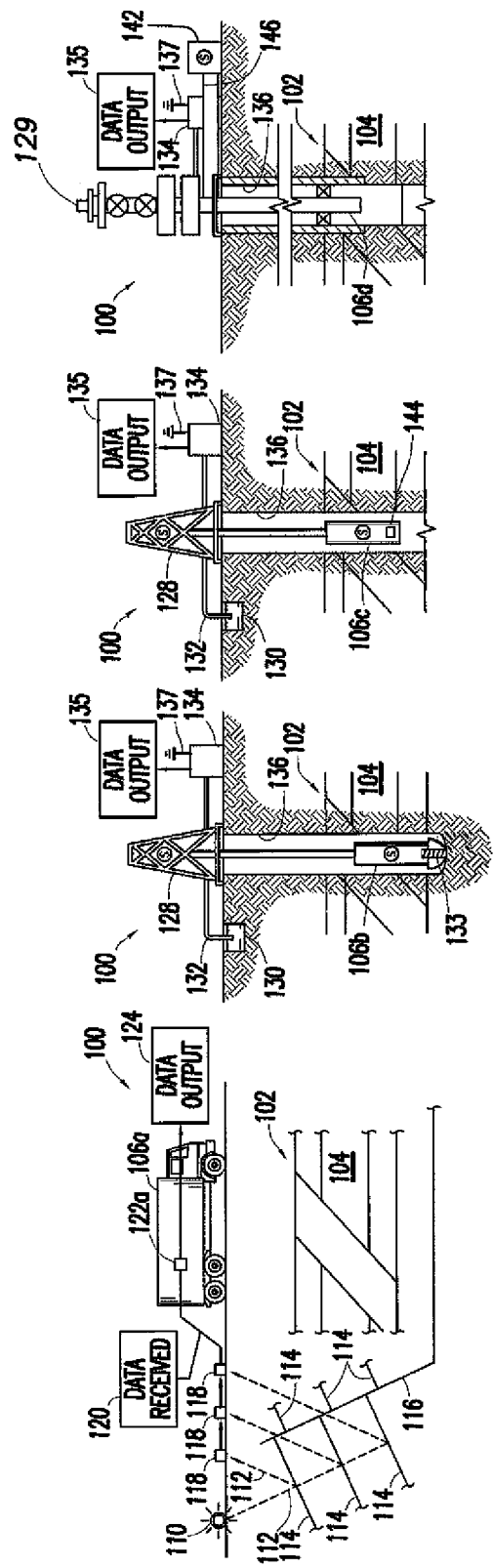

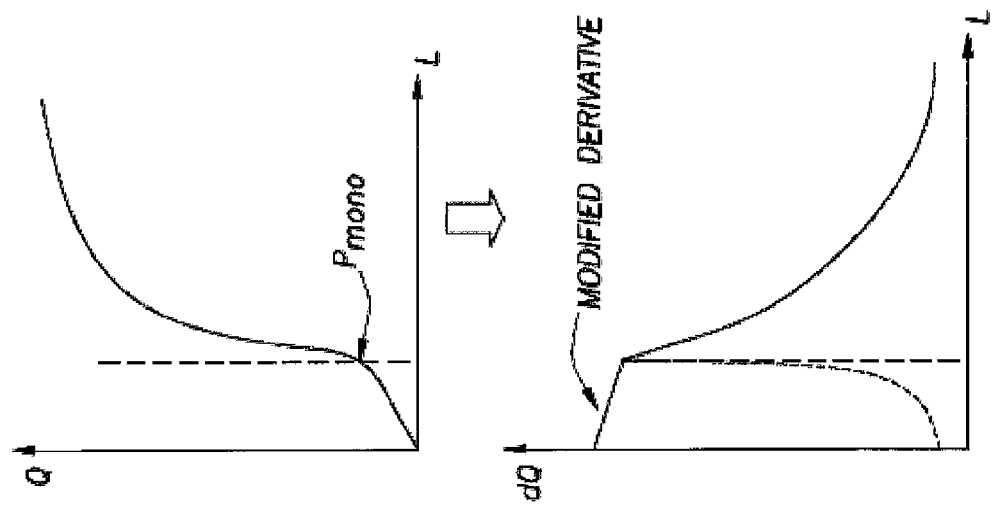
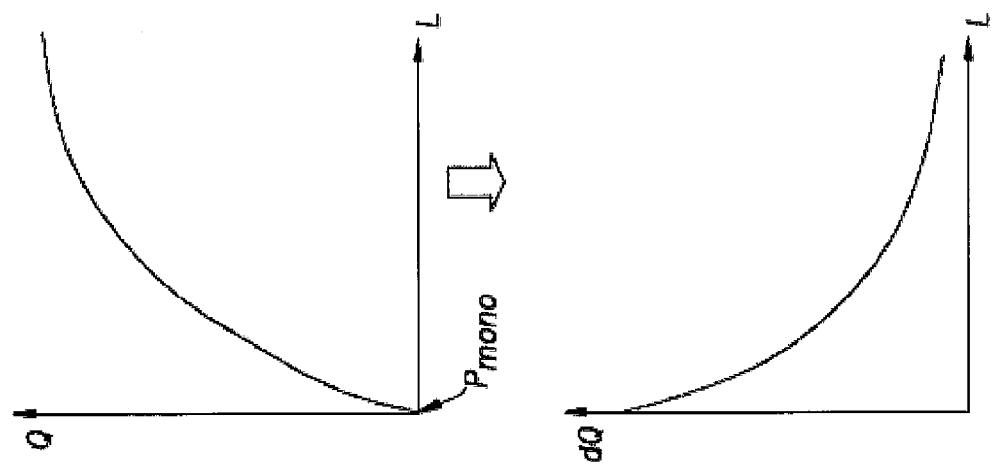
FIG. 21

METHODS AND SYSTEMS FOR PERFORMING OILFIELD PRODUCTION OPERATIONS

CROSS-REFERENCE TO RELATED APPLICATIONS

This patent application claims priority under 35 USC §119 (e) from U.S. Provisional Patent Application No. 61/086,126 filed Aug. 4, 2008, which application is incorporated herein by reference.

BACKGROUND

1. Field of the Invention

The present invention relates to techniques for performing oilfield operations relating to subterranean formations having reservoirs therein. More particularly, the invention relates to techniques for performing oilfield operations involving an analysis of oilfield production conditions, such as gas-lift configuration, production rates, equipment and other items, and their impact on such operations.

2. Background of the Related Art

Oilfield operations, such as surveying, drilling, wireline testing, completions, production, planning and oilfield analysis, are typically performed to locate and gather valuable downhole fluids. For example, surveys are often performed using acquisition methodologies, such as seismic scanners or surveyors to generate maps of underground formations. These formations are often analyzed to determine the presence of subterranean assets, such as valuable fluids or minerals. This information is used to assess the underground formations and locate the formations containing the desired subterranean assets. This information may also be used to determine whether the formations have characteristics suitable for storing fluids. Data collected from the acquisition methodologies may be evaluated and analyzed to determine whether such valuable items are present, and if they are reasonably accessible.

Similarly, one or more wellsites may be positioned along the underground formations to gather valuable fluids from the subterranean reservoirs. The wellsites are provided with tools capable of locating and removing hydrocarbons such as oil and gas, from the subterranean reservoirs. Drilling tools are typically deployed from the oil and gas rigs and advanced into the earth along a path to locate reservoirs containing the valuable downhole assets. Fluid, such as drilling mud or other drilling fluids, is pumped down the wellbore through the drilling tool and out the drilling bit. The drilling fluid flows through the annulus between the drilling tool and the wellbore and out the surface, carrying away earth loosened during drilling. The drilling fluids return the earth to the surface, and seal the wall of the wellbore to prevent fluid in the surrounding earth from entering the wellbore and causing a "blow out".

During the drilling operation, the drilling tool may perform downhole measurements to investigate downhole conditions. The drilling tool may also be used to take core samples of subsurface formations. In some cases, the drilling tool is removed and a wireline tool is deployed into the wellbore to perform additional downhole testing, such as logging or sampling. Steel casing may be run into the well to a desired depth and cemented into place along the wellbore wall. Drilling may be continued until the desired total depth is reached.

After the drilling operation is complete, the well may then be prepared for production. Wellbore completions equipment is deployed into the wellbore to complete the well in preparation for the production of fluid therethrough. Fluid is then allowed to flow from downhole reservoirs, into the wellbore and to the surface. Production facilities are positioned at surface locations to collect the hydrocarbons from the wellsite(s). Fluid drawn from the subterranean reservoir(s) passes to the production facilities via transport mechanisms, such as tubing. Various equipments may be positioned about the oilfield to monitor oilfield parameters, to manipulate the oilfield operations and/or to separate and direct fluids from the wells. Surface equipment and completion equipment may also be used to inject fluids into reservoir either for storage or at strategic points to enhance production of the reservoir.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure and geological stratigraphy that define the geological structures of the subterranean formation. Dynamic data relates to, for example, fluids flowing through the geologic structures of the subterranean formation over time. Such static and/or dynamic data may be collected to learn more about the formations and the valuable assets contained therein.

Sources used to collect static data may be seismic tools, such as a seismic truck that sends compression waves into the earth. Signals from these waves are processed and interpreted to characterize changes in the anisotropic and/or elastic properties, such as velocity and density, of the geological formation at various depths. This information may be used to generate basic structural maps of the subterranean formation. Other static measurements may be gathered using downhole measurements, such as core sampling and well logging techniques. Core samples may be used to take physical specimens of the formation at various depths. Well logging involves deployment of a downhole tool into the wellbore to collect various downhole measurements, such as density, resistivity, etc., at various depths. Once the well is formed and completed, fluid flows to the surface using production tubing and other completion equipment. As fluid passes to the surface, various dynamic measurements, such as fluid flowrates, pressure, and composition may be monitored. These parameters may be used to determine various characteristics of the subterranean formation.

Techniques have been developed to model the behavior of geological formations, downhole reservoirs, wellbores, surface facilities as well as other portions of the oilfield operation. Examples of these modeling techniques are described in Patent/Application/Publication Nos. U.S. Pat. No. 5,992,519, WO2004/049216, W01999/064896, U.S. Pat. No. 6,313,837, US2003/0216897, U.S. Pat. No. 7,248,259, US2005/0149307, and US2006/0197759. Typically, existing modeling techniques have been used to analyze only specific portions of the oilfield operations. More recently, attempts have been made to use more than one model in analyzing certain oilfield operations. See, for example, Patent/Publication/Application Nos. U.S. Pat. No. 6,980,940, WO2004/049216, US2004/0220846, and U.S. Ser. No. 10/586,283. Additionally, techniques for modeling certain aspects of an oilfield have been developed, such as OPENWORKS™ with, e.g., SEISWORKS™, STRATWORKS™, GEOPROBE™ or ARIES™ by LANDMARK™; VOXELGEO™, GEOLOG™ and STRATIMAGIC™ by PARADIGM™; JEWELSUITE™ by JOA™; RMST™ products by ROXAR™, and PETREL™ by SCHLUMBERGER™.

Techniques have also been developed to enhance the production of oilfield from subterranean formations. One such technique involves the use of gas-lifted wells. Gas lift is an artificial-lift method in which gas is injected into the production tubing to reduce the hydrostatic pressure of the fluid column. The resulting reduction in bottomhole pressure allows the reservoir liquids to enter the wellbore at a higher flowrate. The injection gas is typically conveyed down the tubing-casing annulus and enters the production train through a series of gas lift valves. Various parameters for performing the gas lift operation (i.e., lift configuration), such as gas lift valve position, operating pressures and gas injection rate, may be determined by specific well conditions. The injected gas (or lift gas) is provided to reduce the bottom-hole pressure and allow more oil to flow into the wellbore. While the discussion below refers to lift gas, one skilled in the art will appreciate that any resource (e.g., gas, energy for electrical submersible pump (ESP) lifted well, stimulation agents such as methanol, choke orifice size, etc.) may be used to provide or enhance lift.

There are many factors to consider in designing a gas lift operation. The optimal conditions for performing a gas lift operation may depend on a variety of factors, such as the amount of lift gas to inject, inflow performance, equipment (e.g. tubing), surface hydraulics, operating constraints, cost, handling capacities, compression requirements and the availability of lift gas. Moreover, a gas lift well network (i.e., a network including gathering network and at least one gas lift well) may be constrained by the amount of gas available for injection or at other times the total amount of produced gas permissible during production due to separator constraints. Under either of these constraints, engineers may allocate the lift gas amongst the wells to maximize the oil production rate. This is an example of a real world scenario that can be modeled in network simulators.

Techniques have also been developed to predict and/or plan production operations, such as the gas lift operation. For example, a gathering network model may be used to calculate the optimal amount of lift gas to inject into each well based on static boundary conditions at the reservoir and processing facility. Other methods of increasing production in oilfields may include electrical submersible pump (ESP) lifted wells, stimulation by chemical injection, etc. Examples of some gas lift techniques are shown in Patent/Publication/Application Nos. US2006/0076140 and US2007/0246222. Additionally, techniques for modeling certain aspects of an oilfield have been developed, such as PIPESIM™ and GOAL™ by SCHLUMBERGER™ and published in a Society of Petroleum Engineers paper entitled "A Gas Lift Optimization and Allocation Model for Manifold Subsea Wells," SPE20979 by R. Edwards et al.

Despite the development and advancement of reservoir simulation techniques in oilfield operations, a need exists to provide techniques capable of modeling and implementing lift gas operations based on a complex analysis of a wide variety of parameters affecting oilfield operations.

SUMMARY

The present disclosure relates to methods and systems for performing oilfield operations. Embodiments of methods and systems in accordance with the teachings of the present disclosure may advantageously provide techniques capable of optimizing well network production based on a complex analysis of a wide variety of parameters affecting oilfield operations. For example, in one embodiment, a method method of allocating an applied resource throughout a well network includes receiving topological data into an analytical model of a well network having one or more wells. The topological data includes a plurality of performance curves that relate well performance to one or more levels of an applied resource. The method also includes determining an optimum allocation of the applied resource using the analytical model to maximize an operating parameter of the well network, including converting a portion the analytical model having one or more wells and a linear inequality relationship to a modified portion having a single variable and a linear equality constraint. In further aspects, a method may also include coupling an offline solution result with an online solution result during the determining of the optimum allocation.

BRIEF DESCRIPTION OF THE DRAWINGS

So that the above described features and advantages of embodiments in accordance with the teachings of the present disclosure can be understood in detail, a more particular description of at least some embodiments may be had by reference to the embodiments that are illustrated in the appended drawings and described more fully below. It is to be noted, however, that the appended drawings illustrate only typical embodiments in accordance with the teachings of the present disclosure, and are therefore not to be considered limiting of its scope, for the invention may admit to other equally effective embodiments. Further, as used herein, the use of the term "lift gas" should include any possible resource that could provide lift and not be limited merely to include the use of gas.

FIGS. 1A-1D depict a simplified schematic view of an oilfield having subterranean formations containing reservoirs therein, the various oilfield operations being performed on the oilfield. FIG. 1A depicts a survey operation being performed by a seismic truck. FIG. 1B depicts a drilling operation being performed by a drilling tool suspended by a rig and advanced into the subterranean formations. FIG. 1C depicts a wireline operation being performed by a wireline tool suspended by the rig and into the wellbore of FIG. 1B. FIG. 1D depicts a production operation being performed by a production tool being deployed from a production unit and into the completed wellbore of FIG. 1C for drawing fluid from the reservoirs into surface facilities.

FIG. 2A depicts a seismic trace of the subterranean formation of FIG. 1A. FIG. 2B depicts a core test result of the core sample of FIG. 1B. FIG. 2C depicts a well log of the subterranean formation of FIG. 1C. FIG. 2D depicts a production decline curve of fluid flowing through the subterranean formation of FIG. 1D.

FIG. 21 depicts exemplary operating curves in modeling the gas lift injection allocation.

DETAILED DESCRIPTION OF THE INVENTION

Figure 2A:
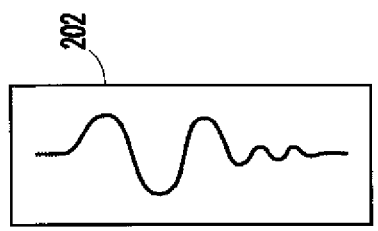
FIGS. 2A-2D depict graphical depictions of data collected by the tools of FIG. 1A-1D, respectively.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness. Further, as used herein, the use of the term "lift gas" should include any possible resource that could provide lift and not be limited to merely include the use of gas.

Generally, embodiments of methods and systems in accordance with the teachings of the present disclosure provide techniques capable of modeling and implementing lift gas operations based on a complex analysis of a wide variety of parameters affecting oilfield operations. In at least some embodiments, such techniques accommodate changes in the oilfield over time and take into consideration a wide variety of factors such as reservoir conditions, gas lift requirements, and operating constraints (e.g. power requirements for compression and treatment processes). In further embodiments, such techniques may also be configured to perform one or more of the following aspects: use data generated in a pre-processing step to aid the modeling steps, convert a modeling problem into a simpler form to solve, compare modeling results to actual parameters, and perform offline optimization procedures in conjunction with online optimization procedures.

In at least some embodiments, methods and systems in accordance with the teachings of the present disclosure may include determining an optimum allocation of an applied resource using an analytical model to maximize an operating parameter of a well network, including converting a portion the analytical model having one or more wells and a linear inequality relationship to a modified portion having a single variable and a linear equality constraint. In further aspects, such methods and systems may also include coupling an offline solution result with an online solution result during the determining of the optimum allocation, as described more fully below.

As used herein, the term "offline" may be used to refer to results, calculations, or procedures that are performed non-interactively or non-real-time, such as simulations that are performed ahead of time and the results stored for later access. Similarly, the term "online" may be used to refer to results, calculations, or procedures that are performed substantially interactively or real-time.

In most oilfield environments, sensors may be positioned about the oilfield to collect data relating to various oilfield operations. For example, sensors in the drilling equipment may monitor drilling conditions, sensors in the wellbore may monitor fluid composition, sensors located along the flow path may monitor flowrates and sensors at the processing facility may monitor fluids collected. Other sensors may be provided to monitor downhole, surface, equipment or other conditions. Such conditions may relate to the type of equipment at the wellsite, the operating setup, formation parameters or other variables of the oilfield. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The data may be used to predict downhole conditions, and make decisions concerning oilfield operations. Such decisions may involve well planning, well targeting, well completions, operating levels, production rates and other operations and/or operating parameters. Often this information is used to determine when to drill new wells, re-complete existing wells or alter wellbore production. Oilfield conditions, such as geological, geophysical and reservoir engineering characteristics may have an impact on oilfield operations, such as risk analysis, economic valuation, and mechanical considerations for the production of subsurface reservoirs.

Data from one or more wellbores may be analyzed to plan or predict various outcomes at a given wellbore. In some cases, the data from neighboring wellbores, or wellbores with similar conditions or equipment may be used to predict how a well will perform. There are usually a large number of variables and large quantities of data to consider in analyzing oilfield operations. It is, therefore, often useful to model the behavior of the oilfield operation to determine the desired course of action. During the ongoing operations, the operating parameters may need adjustment as oilfield conditions change and new information is received.

FIGS. 1A-1D depict simplified, representative, schematic views of an oilfield (100) having subterranean formation (102) containing reservoir (104) therein and depicting various oilfield operations being performed on the oilfield (100). FIG.

1A depicts a survey operation being performed by a survey tool, such as seismic truck (106a) to measure properties of the subterranean formation. The survey operation is a seismic survey operation for producing sound vibrations (112). In FIG. 1A, one such sound vibration (112) generated by a source (110) and reflects off a plurality of horizons (114) in an earth formation (116). The sound vibration(s) (112) is (are) received in by sensors (s), such as geophone-receivers (118), situated on the earth's surface, and the geophone-receivers (118) produce electrical output signals, referred to as data received (120) in FIG. 1.

In response to the received sound vibration(s) (112) representative of different parameters (such as amplitude and/or frequency) of the sound vibration(s) (112), the geophones (118) produce electrical output signals containing data concerning the subterranean formation. The data received (120) is provided as input data to a computer (122a) of the seismic truck (106a), and responsive to the input data, the computer (122a) generates a seismic data output record (124). The seismic data may be stored, transmitted or further processed as desired, for example by data reduction.

FIG. 1B depicts a drilling operation being performed by one or more drilling tools (106b) suspended by a rig (128) and advanced into the subterranean formations (102) to form a wellbore (136). A mud pit (130) is used to draw drilling mud into the one or more drilling tools (106b) via flow line (132) for circulating drilling mud through the drilling tools (106b), up the wellbore and back to the surface. The one or more drilling tools (106b) are advanced into the subterranean formations to reach reservoir (104). Each well may target one or more reservoirs. The one or more drilling tools (106b) are preferably adapted for measuring downhole properties using logging while drilling tools. The logging while drilling tools (106b) may also be adapted for taking a core sample (133) as shown, or removed so that a core sample (133) may be taken using another tool.

A surface unit (134) is used to communicate with the one or more drilling tools (106b) and/or offsite operations. The surface unit (134) is capable of communicating with the one or more drilling tools (106b) to send commands to the one or more drilling tools, and to receive data therefrom. The surface unit (134) is preferably provided with computer facilities for receiving, storing, processing, and/or analyzing data from the oilfield (100). The surface unit (134) collects data generated during the drilling operation and produces data output (135) which may be stored or transmitted. Computer facilities, such as those of the surface unit (134), may be positioned at various locations about the oilfield (100) and/or at remote locations.

Sensors (S), such as gauges, may be positioned about the oilfield to collect data relating to various oilfields operations as described previously. As shown, the sensor (S) is positioned in one or more locations in the one or more drilling tools 106b and/or at the rig 128 to measure drilling parameters, such as weight on bit, torque on bit, pressures, temperatures, flowrates, compositions, rotary speed and/or other parameters of the oilfield operation. Sensor (S) may also be positioned in one or more locations in the circulating system (e.g. mud pit 130, flow line 132, etc.).

The data gathered by the sensors (S) may be collected by the surface unit (134) and/or other data collection sources for analysis or other processing. The data collected by the sensors (S) may be used alone or in combination with other data. The data may be collected in one or more databases and/or all or transmitted on or offsite. All or select portions of the data may be selectively used for analyzing and/or predicting oilfield operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

Data outputs from the various sensors (S) positioned about the oilfield may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analyses, such as modeling operations. For example, the seismic data output may be used to perform geological, geophysical, and/or reservoir engineering. The reservoir, wellbore, surface and/or process data may be used to perform reservoir, wellbore, geological, geophysical or other simulations. The data outputs from the oilfield operation (100) may be generated directly from the sensors (S), or after some preprocessing or modeling. These data outputs may act as inputs for further analysis.

The data is collected and stored at the surface unit (134). One or more surface units (134) may be located at the oilfield (100), or connected remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) or other locations. The surface unit (134) may also be provided with or functionally connected to one or more controllers for actuating mechanisms at the oilfield (100). The surface unit (134) may then send command signals to the oilfield (100) in response to data received. The surface unit (134) may receive commands via the transceiver or may itself execute commands to the controller. A processor may be provided to analyze the data (locally or remotely) and make the decisions and/or actuate the controller. In this manner, the oilfield (100) may be selectively adjusted based on the data collected. This technique may be used to optimize portions of the oilfield operation, such as controlling drilling, weight on bit, pump rates or other parameters. These adjustments may be made automatically based on computer protocol, and/or manually by an operator. In some cases, well plans may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for generating well logs, performing downhole tests and/or collecting samples. The wireline tool (106c) may be used to provide another method and apparatus for performing a seismic survey operation. The wireline tool (106c) of FIG. 1C may, for example, have an explosive, radioactive, electrical, or acoustic energy source (144) that sends and/or receives electrical signals to the surrounding subterranean formations (102) and fluids therein (not shown).

The wireline tool (106c) may be operatively connected to, for example, the geophones (118) stored in the computer (122a) of the seismic truck (106a) of FIG. 1A. The wireline tool (106c) may also provide data to the surface unit (134). The surface unit (134) collects data generated during the wireline operation and produces data output (135) that may be stored or transmitted. The wireline tool (106c) may be positioned at various depths in the wellbore (136) to provide a survey or other information relating to the subterranean formation.

Sensors (S), such as gauges, may be positioned about the oilfield to collect data relating to various oilfield operations as described previously. As shown in FIG. 1C, the sensor (S) may be positioned in the wireline tool (106c) to measure downhole parameters that relate to, for example porosity, permeability, fluid composition and/or other parameters of the oilfield operation.

FIG. 1D depicts a production operation being performed by a production tool (106d) deployed from a production unit or Christmas tree (129) and into the completed wellbore (136) of FIG. 1C for drawing fluid from the downhole reservoirs into the surface facilities (142). Fluid flows from reservoir (104) through perforations in the casing (not shown) and into the production tool (106d) in the wellbore (136) and to the surface facilities (142) via a gathering network (146).

Sensors (S), such as gauges, may be positioned about the oilfield to collect data relating to various oilfield operations as described previously. As shown, the sensor (S) may be positioned in the production tool (106d) or associated equipment, such as the Christmas tree, gathering network, surface facilities and/or the production facility, to measure fluid parameters, such as fluid composition, flowrates, pressures, temperatures, and/or other parameters of the production operation.

While only simplified wellsite configurations are shown, it will be appreciated that the oilfield (100) may cover a portion of land, sea, and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIGS. 1B-1D depict tools used to measure properties of an oilfield (100), it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The preceding discussion of the oilfield configuration in FIGS. 1A-1D is intended to provide a brief description of an example of an oilfield usable with the present invention. Part, or all, of the oilfield (100) may be on land and/or sea. Also, while a single oilfield (100) measured at a single location is depicted, the present invention may be utilized with any combination of one or more oilfields (100), one or more processing facilities, and one or more wellsites.

Figure 2B:
Figure 2C:
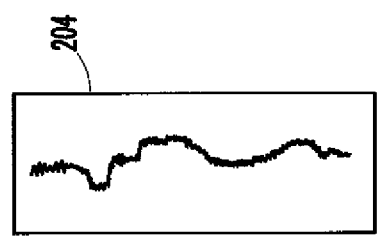
Figure 2D:
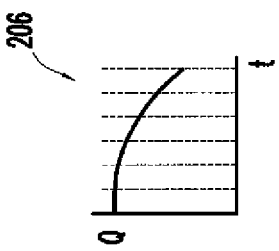

FIGS. 2A-2D are graphical depictions of examples of data collected by the tools of FIGS. 1A-D, respectively. FIG. 2A depicts a seismic trace (202) of the subterranean formation of FIG. 1A taken by seismic truck (106a). The seismic trace may be used to provide data, such as a two-way response over a period of time. FIG. 2B depicts a core sample (133) taken by the drilling tools (106b). The core sample may be used to provide data, such as a graph of the density, porosity, permeability or other physical property of the core sample (133) over the length of the core. Tests for density and viscosity may be performed on the fluids in the core at varying pressures and temperatures. FIG. 2C depicts a well log (204) of the subterranean formation of FIG. 1C taken by the wireline tool (106c). The wireline log typically provides a resistivity or other measurement of the formations at various depts. FIG. 2D depicts a production decline curve or graph (206) of fluid flowing through the subterranean formation of FIG. 1D measured at the surface facilities (142). The production decline curve (206) typically provides the production rate Q as a function of time t.

The respective graphs of FIGS. 2A-2C depict examples of static measurements that may describe information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2D depicts an example of a dynamic measurement of the fluid properties through the wellbore. As the fluid flows through the wellbore, measurements are taken of fluid properties, such as flowrates, pressures, composition, etc. As described below, the static and dynamic measurements may be analyzed and used to generate models of the subterranean formation to determine characteristics thereof. Similar measurements may also be used to measure changes in formation aspects over time.

Figure 3:
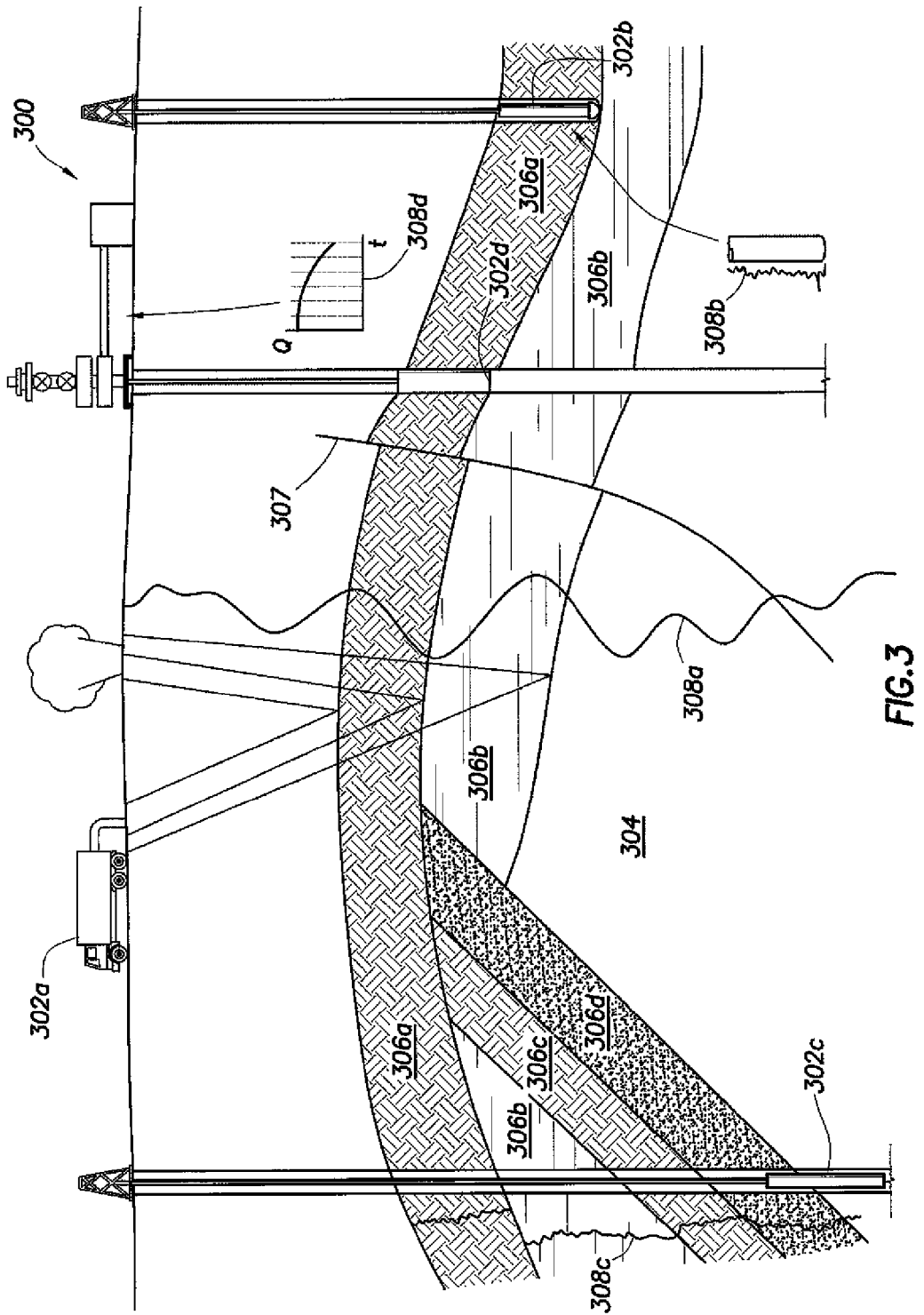
FIG. 3 depicts a schematic view, partially in cross section of an oilfield having a plurality of data acquisition tools positioned at various locations along the oilfield for collecting data from the subterranean formations.

FIG. 3 is a schematic view, partially in cross section of an oilfield (300) having data acquisition tools (302a), (302b), (302c), and (302d) positioned at various locations along the oilfield for collecting data of a subterranean formation (304). The data acquisition tools (302a-302d) may be the same as data acquisition tools (106a-106d) of FIGS. 1A-1D, respectively, or others not depicted. As shown, the data acquisition tools (302a-302d) generate data plots or measurements (308a-308d), respectively. These data plots are depicted along the oilfield to demonstrate the data generated by various operations.

Data plots (308a-308c) are examples of static data plots that may be generated by the data acquisition tools (302a-302d), respectively. Static data plot (308a) is a seismic two-way response time and may be the same as the seismic trace (202) of FIG. 2A. Static plot (308b) is core sample data measured from a core sample of the formation (304), similar to the core sample (133) of FIG. 2B. Static data plot (308c) is a logging trace, similar to the well log (204) of FIG. 2C. Production decline curve or graph (308d) is a dynamic data plot of the fluid flowrate over time, similar to the graph (206) of FIG. 2D. Other data may also be collected, such as historical data, user inputs, economic information, and/or other measurement data and other parameters of interest.

The subterranean formation (304) has a plurality of geological formations (306a-306d). As shown, the structure has several formations or layers, including a shale layer (306a), a carbonate layer (306b), a shale layer (306c) and a sand layer (306d). A fault line (307) extends through the layers (306a, 306b). The static data acquisition tools are preferably adapted to take measurements and detect the characteristics of the formations.

While a specific subterranean formation (304) with specific geological structures are depicted, it will be appreciated that the oilfield may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the oilfield, it will be appreciated that one or more types of measurement may be taken at one or more location across one or more oilfields or other locations for comparison and/or analysis.

The data collected from various sources, such as the data acquisition tools of FIG. 3, may then be processed and/or evaluated. Typically, seismic data displayed in the static data plot (308a) from the data acquisition tool (302a) is used by a geophysicist to determine characteristics of the subterranean formations (304) and features. Core data shown in static plot (308b) and/or log data from the well log (308c) is typically used by a geologist to determine various characteristics of the subterranean formation (304). Production data from the graph (308d) is typically used by the reservoir engineer to determine fluid flow reservoir characteristics. The data analyzed by the geologist, geophysicist and the reservoir engineer may be analyzed using modeling techniques. Examples of modeling techniques are described in Patent/Publication/Application Number U.S. Pat. No. 5,992,519, WO 2004/049216, WO 1999/064896, U.S. Pat. No. 6,313,837, US 2003/0216897, U.S. Pat. No. 7,248,259, US 2005/0149307, and US 2006/0197759. Systems for performing such modeling techniques are described, for example, in U.S. Pat. No. 7,248,259, the entire contents of which are hereby incorporated by reference.

Figure 4:
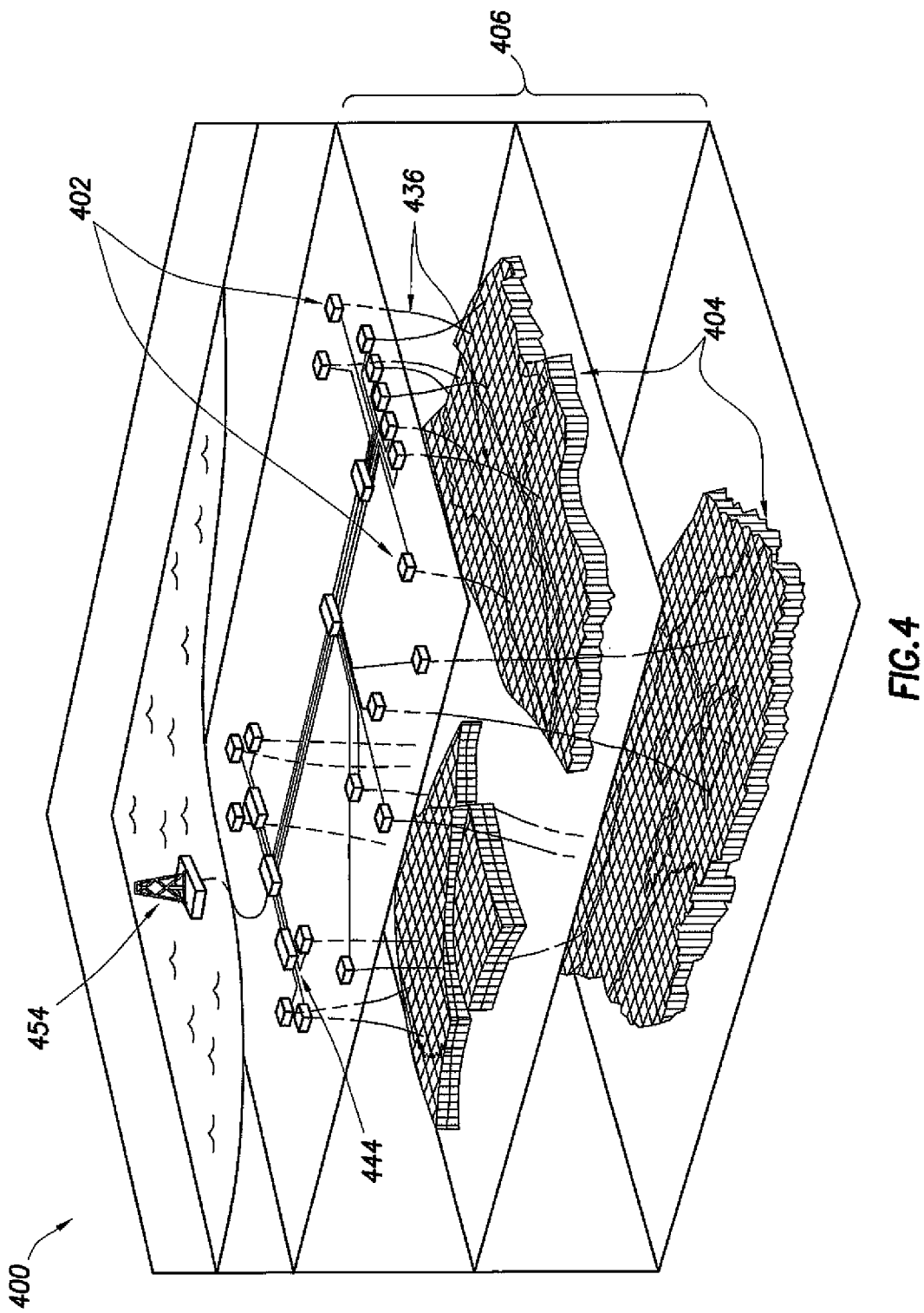
FIG. 4 depicts a schematic view, partially in cross-section of a production operation for an oilfield.

FIG. 4 shows an oilfield (400) for performing production operations. As shown, the oilfield has a plurality of wellsites (402) operatively connected to a central processing facility (454). The oilfield configuration of FIG. 4 is not intended to limit the scope of the invention. Part or all of the oilfield may be on land and/or sea. Also, while a single oilfield with a single processing facility and a plurality of wellsites is depicted, any combination of one or more oilfields, one or more processing facilities and one or more wellsites may be present.

Specifically, the oilfield activity (400) includes multiple wellsites (402) having equipment that forms a wellbore (436) into the earth, which may use steam injection to produce a hydrocarbon (e.g., oil, gas, etc.); rely on a gas lift to produce a hydrocarbon; or produce a hydrocarbon on the basis of natural flow. The wellbores (436) extend through subterranean formations (406) including reservoirs (404). These reservoirs (404) contain fluids, such as hydrocarbons. The wellsites (402) draw fluid from the reservoirs (404) and pass them to the processing facilities via surface networks (444). The surface networks (444) have tubing and control mechanisms for controlling the flow of fluids from the wellsite (402) to the processing facility (454).

Referring back to FIG. 1D, the production operation (100) may be enhanced by performing a gas lift operation. In such cases, gas is injected into the annulus between the production tubing and the casing to reduce the hydrostatic pressure of the fluid column to reduce bottomhole pressure and allows the reservoir liquids to enter the wellbore at a higher flowrate. The injection (or lift) gas is typically conveyed down the tubing-casing annulus and enters the production train through a series of gas lift valves (not shown). The gas lift valve position, operating pressures and gas injection rate are determined by specific well conditions. An example of a gas lift operation is depicted in US Publication Number 2006/0076140. However, it will be appreciated that various equipment and/or configurations may be used for performing the gas lift operation.

A gas lift well network is constrained by the amount of gas available for injection or at other times the total amount of produced gas permissible during production due to separator constraints. Under either of these constraints it is necessary for engineers to optimally allocate the lift gas amongst the wells so as to maximize the oil production rate. This is a real world scenario often modeled in network simulators, such as the software program known as PipeSim which is owned and operated by Schlumberger Technology Corporation of Houston, Tex.

Figure 5:
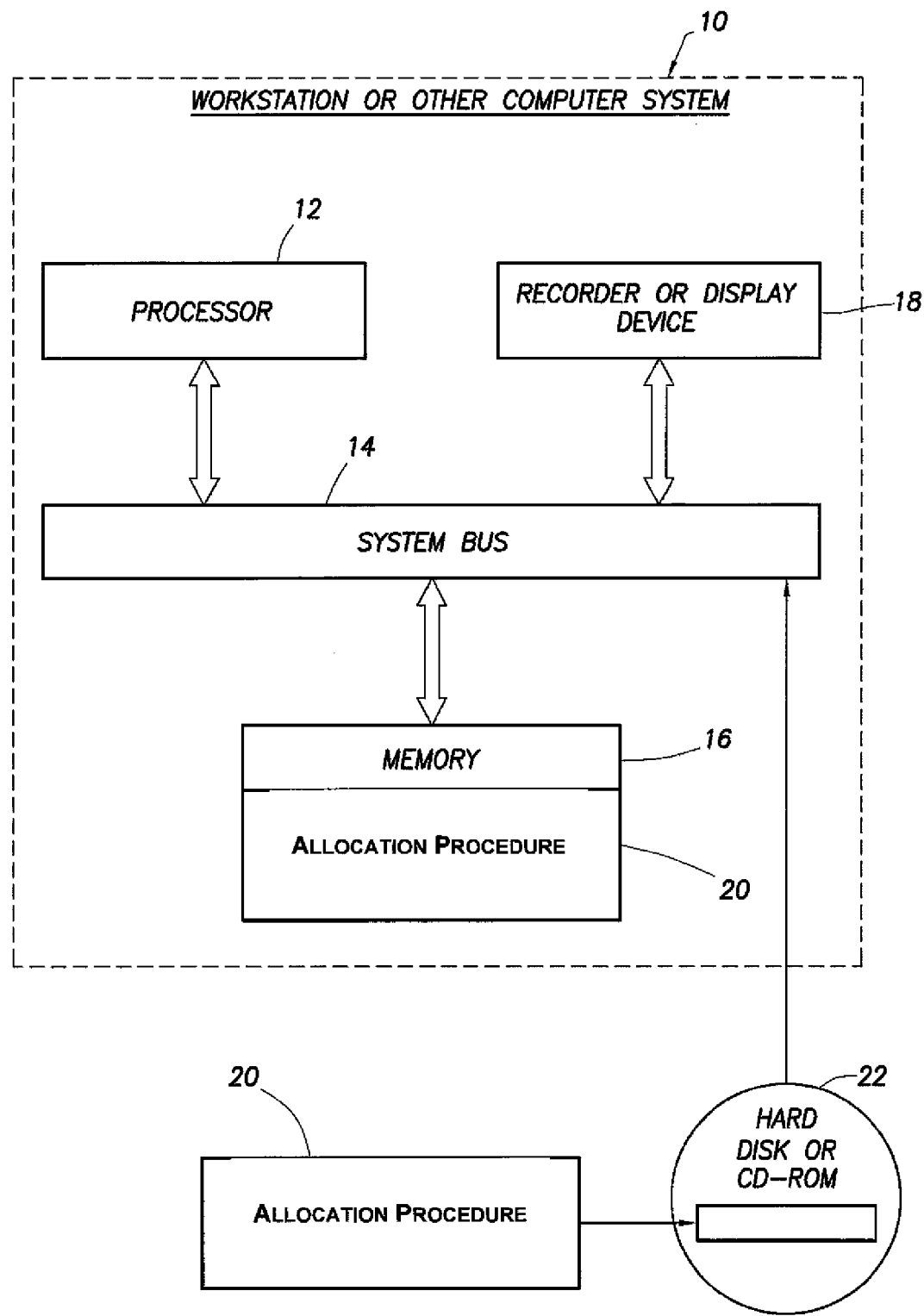
FIG. 5 depicts a workstation or other computer system that stores an Optimal Lift Gas Allocation software disclosed in this specification in accordance with one or more embodiments of the invention.
Figure 7:
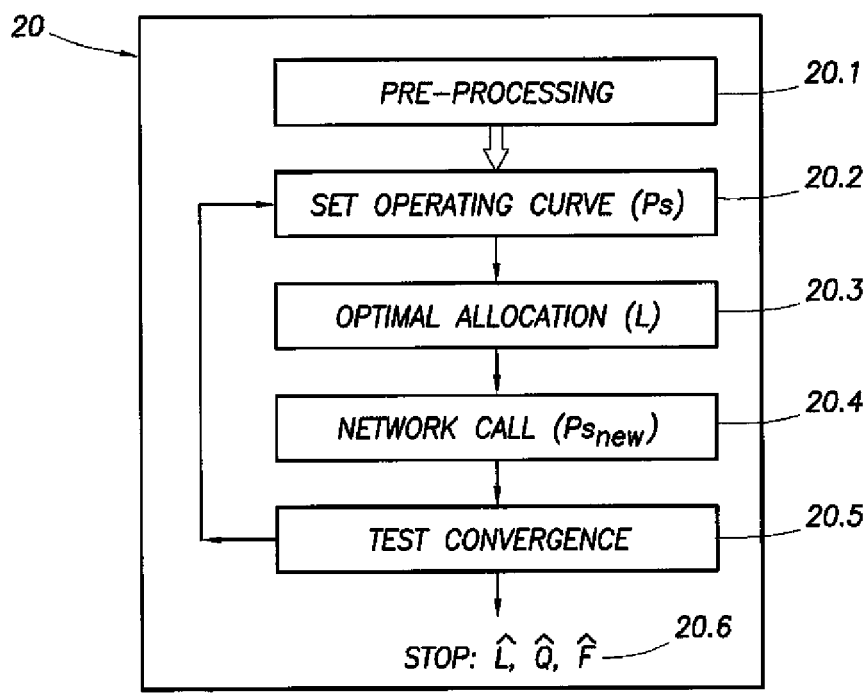
FIG. 7 depicts a flowchart of the Optimal Lift Gas Allocation software in accordance with one or more embodiments of the invention.

Embodiments of methods for optimal lift resource allocation described in this specification are practiced by an allocation procedure (20) for production optimization that is illustrated in FIGS. 5 and 7. As described above, methods of increasing production in oilfields may include lifted wells such as gas lifted wells, electrical submersible pump (ESP) lifted wells, wells stimulated by chemical injection, choked controlled wells, etc. In applying these various methods, the well network is generally constrained by lift resources such as the amount of gas available for injection, amount of power available for ESP lifted wells, amount of chemical available for chemical injection stimulated wells, or at other times by the total production constraints. For example, the total amount of produced gas permissible due to separator constraints.

Embodiments of methods for optimal lift resource allocation may serve to allocate lift resources under the total lift resource constraint or the total produced gas constraint, optimally. In either case, such methods for optimal lift resource allocation may distribute the lift resource among all the wells in the network so as to maximize the liquid/oil rate at the sink, which is a node in the network representing an outlet of the production pipelines where hydrocarbon is removed under an outlet pressure. A particular embodiment of a method for the allocation procedure (20) for production optimization of FIG. 5 is shown in FIG. 7. In this embodiment, the allocation procedure (20) for production optimization of FIG. 7 includes an offline-online optimization procedure, which makes use of pre-generated lift performance curves, in a pre-processing step (step 20.1) of FIG. 7. The lift performance curve may be a lift performance curve for gas lifted well or ESP-lifted well, a stimulation performance curve for chemically stimulated well, or a choke performance curve for choke controlled well. The lift performance curve describes a relationship between the allocated resource (e.g., lift-gas, power, stimulating agent, choke orifice size, or the sum of normalized orifice values for each choke employed) to the increased production rate. The offline problem can be solved with any suitable Non-Linear Program (NLP) solver in order to solve the N-variable, inequality constrained problem. In addition, the optimal allocation procedure for production optimization (20) of FIG. 7 may use a novel Newton-decomposition approach during step 20.3 of FIG. 7, to solve the offline problem (as described more fully below with respect to FIG. 12). This results in a problem of a single variable with a linear equality constraint. Alternately, any other suitable conventional solution procedure may be used. In one or more embodiments of the invention, a network simulator may be employed to generate curves or to run the network for the online solution using the lift resource allocations from the offline solution.

It will be appreciated that the allocation of a constrained resource (e.g. lift gas, electrical power, injection material, etc.) can be complicated in the presence of many additional operating constraints (e.g. max water handling, max free gas, manifold level constraints, etc.), and that the constrained resource allocation can include any number of additional operating constraints (not just the one pertaining to the constrained resource). For this reason, in some embodiments, the allocation procedure (20) (FIGS. 5 & 7) may include a genetic algorithm solver that is configured to provide improved optimizations for such multi-variable environments. As used herein, the term "genetic algorithm" may include a variety of stochastic search algorithms that rely on an objective function value to determine new search steps, and therefore, no gradient information is necessary. Such genetic algorithms may be advantageously used when no gradient information is available, or when traditional algorithms are unable to adequately handle instances of strong non-linearities. Methods for optimal lift resource allocation may be equally applicable to the allocation of lift gas for gas lifted wells, power for ESP-lifted wells and further can be used to allocate (or control) downhole choke settings (e.g., choke sizes) and the optimal injection of chemicals, such as methanol for stimulation, in order to maximize the level of production. Indeed, methods for optimal lift resource allocation can treat a mixed network including any of the aforementioned items, for example, a network containing both gas- and ESP-lifted wells.

In an example, a network model for gas lifted wells (or other wells, such as ESP-lifted, chemical injection stimulated wells, or down hole coke controlled wells) in network simulators, such as PipeSim, includes a topological description of the network, the boundary constraints at sources and sinks, the compositions of the fluids in the wells, the flow correlations employed and the level of gas injected into the wells. The latter can be considered as control variables, while all other elements can be deemed constant (network parameters), with respect to the optimization of production (liquid/oil rate) at the sink node in a gas lift optimization scenario.

For a network with N-wells, the intent is to optimally allocate a fixed amount of lift resource (C) (e.g., lift gas, ESP power, injected chemical, choke sizes, etc.), such that the production at the sink $F_{nw}$ is maximized.

See equation (1) set forth below, which will be referenced later in this specification, as follows:

$$\text{maximize } F_{nw} = PSim(L; \text{network parameters}) \quad (1)$$

$$\text{such that } \sum_{i=1}^{N} L_i \leq C$$

$$\text{where: } L \in R^N$$

where, L describes the vector (size N) of lift resource in the wells and PSim represents the simulation output of the network simulator, such as PipeSim, using L and other network parameters as inputs to the simulation model.

The allocation of a fixed amount of lift resource amongst N-wells is a non-linear constrained optimization problem, with the objective to maximize the production rate at the sink. There are at least three (3) ways to tackle this optimization problem: Directly, Indirectly or using a Simplified Approach, as discussed below.

Direct optimization refers to the use of a standard Non-Linear Program (NLP) solver, such as the Sequential Quadratic Programming method (SQP) or the Augmented Lagrangian Method (ALM), on the real objective function (Equation 1), where each function evaluation is a call to the network simulator. If the number of variables (the wells) are great and the simulation is expensive to run, this approach can be time consuming and computationally costly. Solvers in this class often require derivatives and can only guarantee finding the local optimum given the starting conditions specified.

For example, this approach is available through the use of simulators, such as Schlumberger's Avocet Integrated Asset Management (IAM) tool via a process plant simulator, (e.g., Hysys developed by Aspentech headquartered in Burlington, Mass., and Schlumberger Doll Research (SDR) Optimization Library, etc.). As used herein, the term 'Schlumberger' refers to Schlumberger Technology Corporation located in Houston, Tex. Additionally, numerical reservoir simulators, such as Schlumberger's numerical reservoir simulator application, Eclipse, may also contain a lift-gas allocation optimizer. However, such conventional simulators are based on a heuristic allocation procedure, which involves discretizing the lift resource available and moving the smaller units to wells with increasing incremental production gradients. The allocation procedure is completed when a stable state is reached in each of the wells. Finally, it is worth noting that the SQP solver is also employed by Petroleum Expert's GAP application.

Indirect optimization refers to the application of a standard NLP solver not on the real objective function but on an approximation of it. This is achieved by sampling the real function over the domain of interest and creating a response surface, using a neural net (NN) for example on which the optimizer is employed. If the response surface is of sufficient quality and sequentially updated with results from the real function, a near optimal solution can be obtained in place of optimizing the actual function at much reduced cost. This approach is made available, for example, in the SDR Optimization Library using an optimizer, such as the NN-Amoeba optimizer. As used herein, the Amoeba refers to a modified version of Nelder and Mead's Downhill Simplex algorithm.

The simplified approach is to replace the original complicated model or problem with one that is more tractable and easier to solve. This simplification evidently introduces a certain amount of model error, however it is assumed justifiable with respect to the availability and speed of solution. For the gas lift allocation problem as an example of allocating lift resources, an application referred to as Goal (developed by Schlumberger) may be used. The Goal application uses a simplified representation of the real network problem (i.e., uses black oil compositions only) and works on a collection of lift performance curves using a heuristic approach. It has the advantage of being robust and providing a fast solution. The downside however is that the network must be simplified and re-created specifically within the application. Additionally, testing has shown that an optimal solution is not guaranteed. This problem will be compounded with large-scale networks (100+ wells).

Referring to FIG. 5, a workstation (10) or other computer system is illustrated which stores the optimal allocation procedure for production optimization (20) that is disclosed in this specification. More specifically, the computer system (10) of FIG. 5 may include a processor (12) operatively connected to a system bus (14), a memory or other program storage device (16) operatively connected to the system bus (14), and a recorder or display device (18) operatively connected to the system bus (14). The memory or other program storage device (16) may store the optimal allocation procedure for production optimization (20) that practices an allocation method adapted for optimally allocating lift resource under a total lift resource constraint or a total produced gas (or production) constraint as disclosed in this specification (hereinafter called a method for optimal lift resource allocation). The optimal allocation procedure for production optimization (20), which may be stored in the memory (16) of FIG. 5, can be initially stored on a hard disk or CD-ROM (22), where the hard disk or CD-ROM (22) is also a program storage device. The CD-ROM (22) can be inserted into the computer system (10) and the optimal allocation procedure for production optimization (20) can be loaded from the CD-ROM (22) and into the memory/program storage device (16) of the computer system (10) of FIG. 5. The processor (12) executes the optimal allocation procedure for production optimization (20) that is stored in memory (16) of FIG. 5; and, responsive thereto, the processor (12) distributes the lift resource among all the wells in a network model (as shown in FIG. 6) so as to maximize the liquid/oil rate at the sink.

The computer system (10) of FIG. 5 may be a personal computer (PC), a workstation, a microprocessor, or a mainframe. Examples of possible workstations include a Silicon Graphics workstation or a Sun SPARC workstation or a Sun ULTRA workstation or a Sun BLADE workstation. The memory or program storage device (16) (including the above referenced hard disk or CD-ROM (22)) is a computer readable medium or a program storage device, which is readable by a machine using the processor (12). The processor (12) may be, for example, a microprocessor, microcontroller, or a mainframe or workstation processor. The memory or program storage device (16), which stores the optimal allocation procedure for production optimization (20), may be, for example, a hard disk, ROM, CD-ROM, DRAM, or other RAM, flash memory, magnetic storage, optical storage, registers, or other volatile and/or non-volatile memory.

Figure 6:
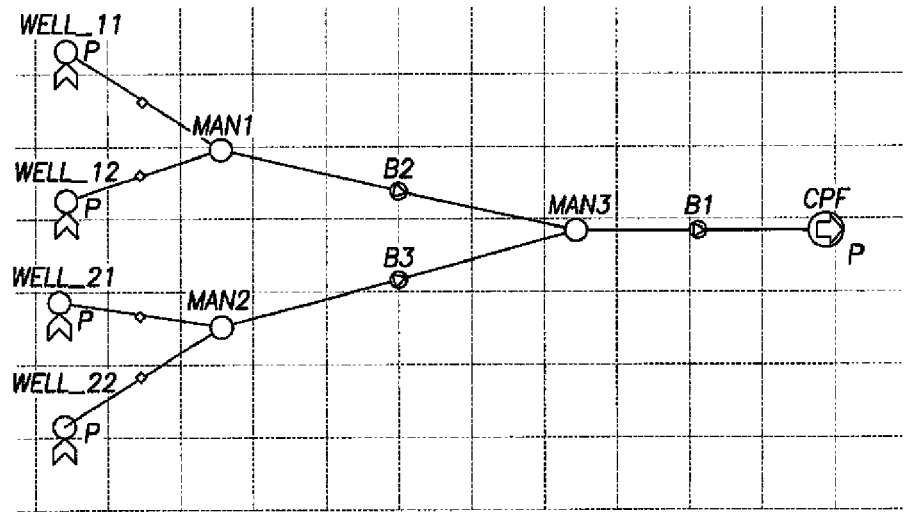
FIG. 6 depicts a network model comprising a gas lift network with four wells in accordance with one or more embodiments of the invention.

Referring to FIG. 6, a network model including a lifted well network with four (4) wells and a sink is illustrated, where the four wells include well_11, well_12, well_21, well_22 and the sink includes a network node CPF. In FIG. 6, the method disclosed in this specification anticipates the availability of a network model, such as the network model illustrated in FIG. 6. In addition, the network model includes at least one well model for modeling well_1, well_12, well_21, and/or well_22. The terms network, well, and sink are used to describe either the respective physical entity (e.g., as shown in FIG. 4) or a corresponding model (e.g., as shown in FIG. 6) representing the respective physical entity depending on the context of the description. Although only three wells and one sink are included in the network model, those skilled in the art will appreciate that any number of wells and/or sinks may be included without deviating from the spirit of the invention. The network model illustrated in FIG. 6 describes the network topology and defines the wells under lift, chokes, or stimulation. The method for optimizing this production scenario is able to deal with a network comprising any of the above items or any combination thereof, given a fixed amount of lift resource such as lift-gas, power, stimulating agent or the sum of normalized orifice values for each choke employed. The method described herein applies equally to these various elements of lift resources described above in mixed networks.

Figure 12:
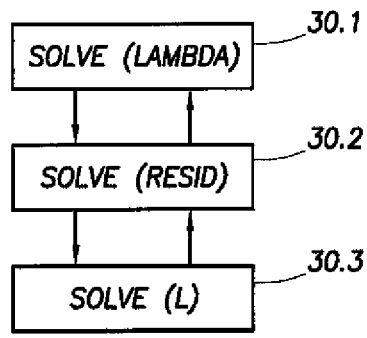
FIG. 12 depicts a flowchart for solving for Lambda in accordance with one or more embodiments of the invention.

The optimal allocation procedure for production optimization (20) of FIG. 7 may practice a method for optimal lift resource allocation disclosed in this specification. The method for optimal lift resource allocation disclosed in this specification: (1) uses lift performance curve data generated at a pre-processing step, as shown in step 20.1 in FIG. 7 to solve the lift resource allocation problem offline, (2) uses a novel development of the Rashid's Newton Decomposition (RND) (as shown in FIG. 12) during the optimal allocation (step 20.3) of FIG. 7 to convert the original problem of N-wells and a linear inequality into one of a single variable with a linear equality constraint, and then (3) runs a network simulator, such as PipeSim, to determine whether the solution is in agreement with the actual network model for the wellhead pressures of each well. In addition, the method for optimal lift resource allocation disclosed in this specification has the advantage of being fast, accurate, and providing an optimal solution since it uses the 'real network model' of FIG. 6 and it significantly reduces the number of function evaluations of the simulator (e.g., PipeSim) in comparison to the direct optimization method mentioned above. Hence, the method for optimal lift resource allocation disclosed in this specification has the advantage of a simplified approach with the accuracy of a solution gained from direct optimization, etc. Results have been successfully obtained on networks with up to 100 wells and validated with conventional approaches.

Accordingly, methods and systems for optimal lift resource allocation in accordance with the teachings of the present disclosure may be practiced by the optimal allocation procedure for production optimization (20) stored in the memory (16) of FIG. 5. An embodiment of the optimal allocation procedure for production optimization (20) of FIG. 5 is illustrated in FIG. 7, and is discussed in detail in the following paragraphs of this specification with reference to FIG. 7.

Referring to FIG. 7, a flowchart of the optimal allocation procedure for production optimization (20) of FIG. 5 is illustrated. In FIG. 7, the method for optimal lift resource allocation practiced by the optimal allocation procedure for production optimization (20) of FIG. 5 uses an offline-online optimization procedure. That is, following the extraction of lift performance curves, an offline optimization problem is given by equation (2) and equation (3) set forth below. When the optimal allocation of lift resource rates ($\hat{L}$) (i.e., the rates whereby the lift resources are applied) have been obtained offline a so-called "real network problem" is solved using equation (1), set forth above, using the optimal allocation of lift resource rates ($\hat{L}$) to thereby obtain the production value at the sink ($F_{nw}$) along with the updated well head pressures at each of the wells ($P_s$). The offline optimal allocation procedure is then repeated by using equation (2), set forth below, and using the updated well head pressures ($P_s$).

Equation (2) is set forth below, as follows:

$$\text{maximize } F_{RND} = \text{offline}(L; P_s) \qquad (2)$$

$$\text{such that } \sum_{i=1}^{N} L_i \leq C$$

$$\text{where: } L \in R^N$$

More specifically, this is given by equation (3) set forth below as follows:

$$\text{maximize } F_{RND} = \sum_{i=1}^{N} Q_i \qquad (3)$$

$$\text{such that } \sum_{i=1}^{N} L_i \leq C$$

$$\text{where: } L \in R^N$$

where: $Q_i = f(L_i; P_s)$ describes the lift performance curve such as lift performance curve for a given wellhead pressure.

In the embodiment shown in FIG. 7, the method for optimal lift resource allocation disclosed in this specification and practiced by the optimal allocation procedure for production optimization (20) of FIG. 5 is given in algorithm form in FIG. 7 for the total resource available constraint.

Figure 8:
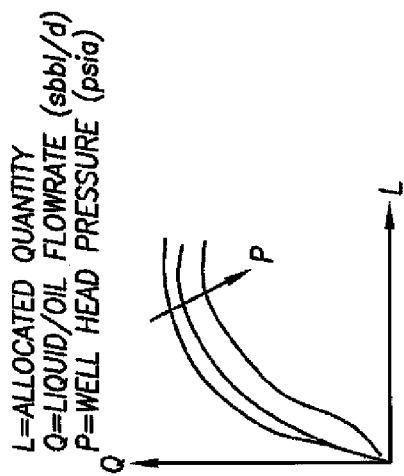
FIG. 8 depicts lift performance curves in accordance with one or more embodiments of the invention.

Referring to FIGS. 6, 7, and 8, a network model including a lifted well network with four (4) wells is illustrated in FIG.

6, a flowchart of the optimal allocation procedure for production optimization (20) of FIG. 5 is illustrated in FIG. 7, and a family of lift performance curves is illustrated in FIG. 8.

Step 20.1 of FIG. 7—Pre-Processing

In the pre-processing step (step 20.1) of FIG. 7, a family of lift performance curves (shown in FIG. 8) are generated for each well (that is, well_11, well_12, well_21, and well_22) in the network model of FIG. 6. These describe the expected liquid flowrate for a given amount of lift resource application (e.g., gas injection) at given wellhead pressures. For ESP wells, this would be flowrate versus horsepower; for chokes, flowrate versus deltaP (or orifice size); and for stimulation, flowrate versus methanol injection rate. The pre-processing step (step 20.1) of FIG. 7 is completed using a network simulator, such as PipeSim, Prosper/GAP by Petroleum Experts, or any other suitable network simulator.

Note that the x-axis values are common over all wells and that they are normalized. This allows the solution of mixed networks, though each lift type is effectively treated as a sub-problem. That is, for example, all gas lift wells are solved for the gas available and all ESP wells are solved for the power available. The constraint value is also normalized as a result.

Step 20.2 of FIG. 7—Set Operating Curve

In FIG. 7, when the pre-processing step (step 20.1) is completed, the Set Operating Curves (Ps) step (step 20.2) is performed, where each well is assigned an initial wellhead pressure (Ps). This sets the operating curve for the well: [flowrate (Q) v lift gas (or quantity) (L); at a given (Ps)]. At subsequent iterations, the updated wellhead pressure obtained in a Network Call step (step 20.4) is set. If the desired wellhead pressure does not match the family of curves stored, it is generated by interpolation.

Step 20.3 of FIG. 7—Optimal Allocation

In FIG. 7, in the Optimal Allocation (L) step (step 20.3), the lift resource rates (L) are optimally allocated among the N-wells of the network model of FIG. 6 (that is, well_11, well_12, well_21, and well_22 of FIG. 6) are obtained according to the total lift resource constraint (C) so as to maximize the total flowrate ($F_{RND}$), given by equations (2) and (3) set forth above. This is a constrained non-linear problem and is typically solved using a SQP solver or an ALM approach.

The method for optimal lift resource allocation practiced by the optimal allocation procedure for production optimization (20) of FIGS. 5 and 7 disclosed in this specification differs from any standard approaches for the treatment of equation (2) in several ways. First, and non-trivially, the problem is converted to one of a single variable, and second, the problem is solved directly using a modified Newton's method. This decomposition ensues from the treatment of the constraint as an equality, along with the formation and use of the inverse derivative curves in order to solve the Karush-Kuhn-Tucker (KKT) conditions for optimality directly. Hence, the method is referred to as Rashid's Newton Decomposition (RND).

For example, the augmented penalty function is given by equation (4), as follows:

$$\text{minimize } M(L, \lambda) = -F_{RND} + \lambda \left\{ \max\left(0, \left(\sum_{i=1}^{N} L_i - C\right)\right)\right\}^2 \quad (4)$$

$$\text{where: } L \in R^N, \lambda \in R$$

where $\lambda$ is a penalty factor. However, if it is assumed that the operator will use all the lift gas available then the penalty function can be stated by equation (5) as follows:

$$\text{minimize } M(L, \lambda) = -F_{RND} + \lambda \left(\sum_{i=1}^{N} L_i - C\right) \quad (5)$$

$$\text{where: } L \in R^N, \lambda \in R$$

Impose the KKT optimality conditions in equations (6) and (7), as follows:

$$\frac{\partial M}{\partial L_i} = -\frac{\partial Q_i}{\partial L_i} + \lambda = 0 \quad (6)$$

$$\text{hence: } \frac{\partial Q_i}{\partial L_i} = \lambda$$

$$\text{where: } Q_i = f(L_i; P_s)$$

$$\frac{\partial M}{\partial \lambda} = \sum_{i=1}^{N} L_i - C = 0 \quad (7)$$

$$\text{hence: } \sum_{i=1}^{N} L_i = C$$

where equation (7) simply treats the allocated lift resource as an equality constraint with respect to the lift resource available, and equation (6) suggests that the slopes of the operating curves for each of the wells has the same value $\lambda$. But what value should the penalty factor $\lambda$ take? If the derivative of the operating curve [Q v L] is used to give [dQdL v L], then it can be seen that $\lambda$ merely indicates a derivative level. Hence, $\lambda$ is bound between the highest and lowest possible derivative value dQdL for all wells. A solution may be found by finding a level for $\lambda$ that also satisfies equation (7).

Figure 9:
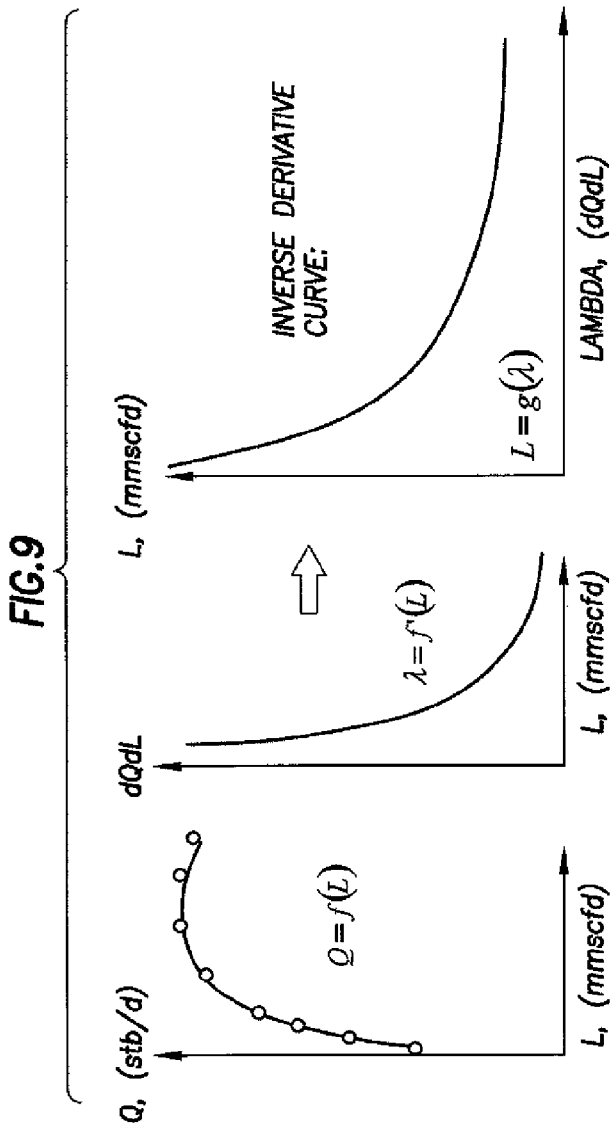
FIG. 9 depicts forming the inverse derivative curve in accordance with one or more embodiments of the invention.

FIG. 9 illustrates a formation of an inverse derivative curve. More specifically, in FIG. 9, the inverse of the derivative curve from [dQdL v L] to [L v dQdL] is formed for each well.

If $L_i = g_i(\lambda)$, then superimposing all inverse derivative curves and summing gives:

$$E = \sum_{i=1}^{N} L_i.$$

Figure 10:
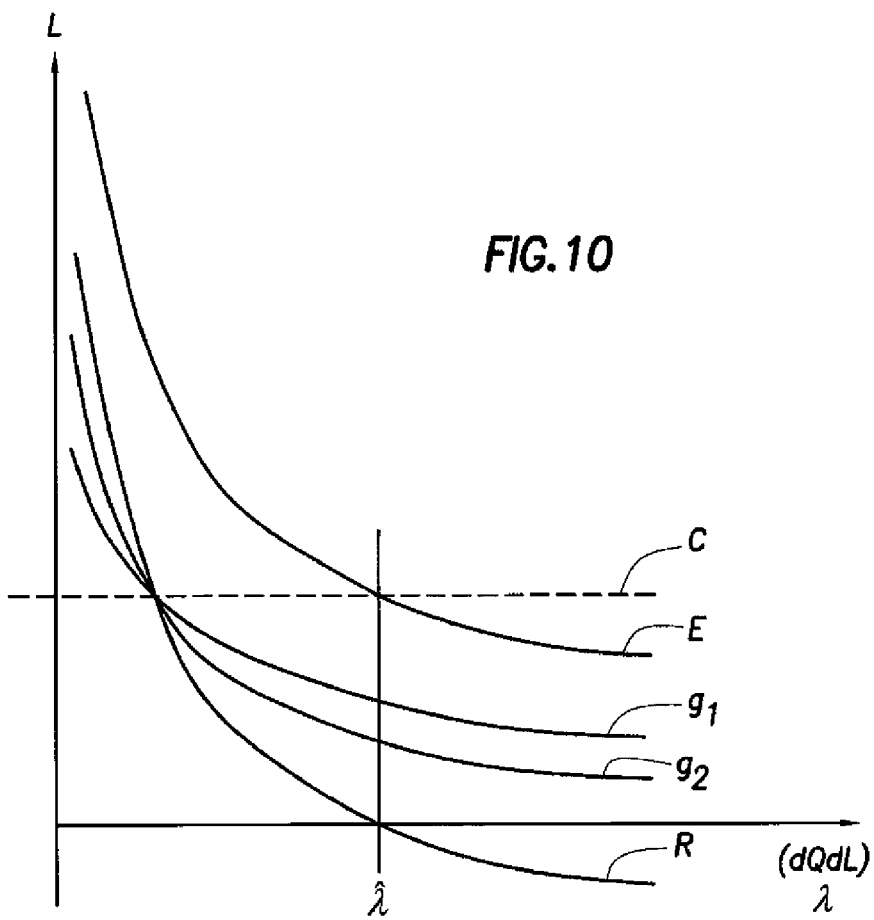
FIG. 10 depicts solving the 1-D problem (2 well case shown) in accordance with one or more embodiments of the invention.

FIG. 10 illustrates solving a 1-D problem (2 well case shown). More specifically, in FIG. 10, E is constrained by the total resource available C, therefore in practice, E≤C However, if C is treated as an equality constraint under the assumption that all the available lift resource is used, a residual function may be composed, in equations (8), (9), (10), and (11), as follows:

$$R(\lambda) = E(\lambda) - C \quad (8)$$

and solve $R(\lambda)=0$ for $\lambda$ using Newton's method (see FIG. 10):

$$\lambda_{new} = \lambda_{old} - \frac{R(\lambda)}{R'(\lambda)} \quad (9)$$

-continued $$\text{where: } R(\lambda) = \sum_{i=1}^{N} g_i(\lambda) - C \tag{10}$$

$$\text{and: } R'(\lambda) = \frac{dR}{d\lambda} = \sum_{i=1}^{N} \frac{dg_i(\lambda)}{d\lambda} \tag{11}$$

Figure 11:
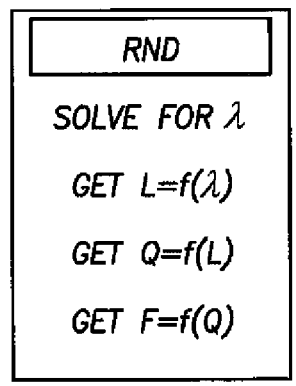
FIG. 11 depicts a more detailed construction of step 20.3 of FIG. 7 in accordance with one or more embodiments of the invention.

Referring to FIGS. 7 and 11, a flowchart of the optimal allocation procedure for production optimization (20) of FIG. 5 is depicted in FIG. 7, and a more detailed construction of the Optimal Allocation step (step 20.3) of FIG. 7 is depicted in FIG. 11. In FIGS. 7 and 11, the Optimal Allocation step (step 20.3) in FIG. 7 can now be labeled as "Rashid's Newton Decomposition (RND)" for the solution of an N-variable linear inequality constrained non-linear problem. FIG. 11 depicts the "Rashid's Newton Decomposition (RND)" and the solution of the N-variable linear inequality constrained non-linear problem.

As noted above, FIG. 10 depicts solving the 1-D problem (2 well case shown) in accordance with one or more embodiments of the invention. Referring to FIG. 10, a solution for "lambda" is sought using Newton's method. An embodiment of a procedure for the solution of lambda is shown in FIG. 12. In FIG. 12 in connection with the solve (lambda) step (step 30.1), initial estimates are set by default for high and low values of lambda.

In connection with the residual function step (step 30.2) of FIG. 12, the residual function is evaluated (step 30.2). If the bracket is not found, successive secant steps are taken until the solution is bracketed. Once the bracket is found, Newton's method is employed to isolate the solution $\hat{\lambda}$, starting initially from the mid-point of the bracket. In FIG. 12, in step 30.2, the residual function (which is a function of lambda) is evaluated by implementing step 30.3 of FIG. 12, which is the solve (L) step (step 30.3). That is, the residual function (which is a function of lambda) is evaluated by solving for the L value on each operating curve for each well for the given lambda value (step 30.3 in FIG. 12). The residual function is composed as a sum of the individual operating curves at the given lambda, as shown in equation (10) above.

Figure 13:
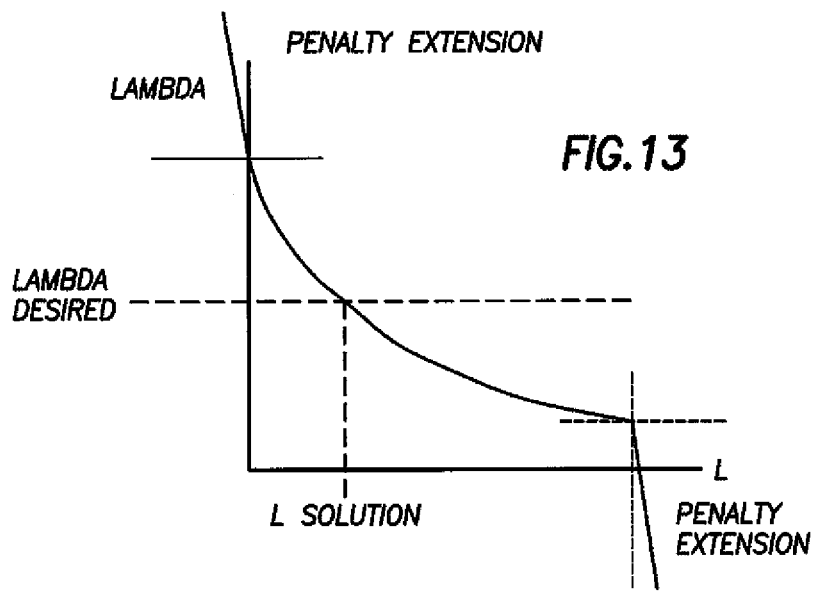
FIG. 13 depicts solving for L given lambda desired in accordance with one or more embodiments of the invention.

FIG. 13 depicts solving for the L value, given the desired value of lambda in accordance with one or more embodiments of the invention. In FIG. 13, the monotonically decreasing derivative curve for each well is solved for the lift value ($L_i$) given the desired lambda value (step 30.3 of FIG. 12). Note the penalty line extensions that ensure that a lambda solution is always returned in case of very high or negative lambda values.

Referring again to FIG. 9, it is important to note that the inverse problem (that is, solving for $L_i$ for a desired lambda) is solved so as to obviate the need for modeling the inverse derivative curve (function: $L_i = g_i(\lambda)$). Although this requires a greater number of function evaluations as a result, it is better than degrading the solution quality by successive curve fitting (see FIG. 9).

As the x-axis are normalized by default, the bracket is also defined by default. Hence, the bisection method is employed for several steps to reduce the size of the bracket before Newton steps are taken to convergence. This provides a computationally efficient and robust solution.

Step 20.4 of FIG. 7—Network Call

In FIG. 7, recalling that the allocation procedure generates a solution of the problem represented by equation (2) for a given set of well head pressures ($P_s$), when the allocation procedure is completed and the solution of the problem represented by equation (2) for a given set of well head pressures ($P_s$) is obtained, the 'real network model' represented by equation (1) is called with the optimal lift resource values ($\hat{L}$) assigned to the wells of the network model of FIG. 6. The production rate at the sink ($F_{nw}$) can be used to compare the solution from the offline solution ($F_{RND}$), though primarily it is the new wellhead pressures that are sought ($P_s^{new}$), as indicated by the 'Network Call ($P_s^{new}$)' (step 20.4 of FIG. 7).

Step 20.5 of FIG. 7—Convergence Test

Referring again to FIG. 7, the procedure repeats until there is convergence between the old and new estimates of the wellhead pressure for all the wells (step 20.5 of FIG. 7). For example, in at least some embodiments, at least two tests can be made, the L2-norm or the infinity-norm (maximum absolute difference):

$$L_2\text{-norm } err_1 = \sqrt{AA^T} \tag{12}$$

$$L_\infty\text{-norm } err_2 = \max(A) \tag{13}$$

where: $A = abs\lfloor P_s^{new} - P_s \rfloor$

If the convergence test is not met, the procedure repeats by returning to step 20.2 of FIG. 7. The operating curve for each well of the network model of FIG. 6 is updated according to the new well head pressure.

Step 20.6 of FIG. 7—Stop

In FIG. 7, referring to the stop (step 20.6), once convergence has been achieved (in step 20.5 of FIG. 7), the optimal allocation vector ($\hat{L}$), the converged wellhead pressures ($\hat{P}_s$), the resulting well flowrates ($\hat{Q}$), and the total production flowrate ($\hat{F}$) are returned along with other algorithm metrics (step 20.6).

Test Study Results

Test studies have shown that methods for optimal lift gas allocation in accordance with the teachings of the present disclosure require far fewer function evaluations in comparison to direct optimization. For example, Tables 1-3 below show results for gas lift networks comprising 2, 4, and 100 wells respectively. The results shown in Tables 1-3 demonstrate that methods for optimal lift gas allocation in accordance with the present disclosure take less computational effort in time and fewer number of network simulator calls in comparison to direct and indirect optimization approaches. The use of NLP solvers (e.g., ALM and SQP) requiring numerical derivative evaluations require even greater number of function evaluations. These differences are compounded with large-scale networks and the significant reduction achieved in the number of real function calls is of great value.

TABLE 1

Results for 2-well GL Network

| Allocate: 2 mmscfd | GLOPT using RND (proposed) | Amoeba (direct) | NN-Amoeba (indirect) |
|---|---|---|---|
| well-11 | 1.1010 | 1.0962 | 1.1003 |
| well-12 | 0.8990 | 0.9032 | 0.8997 |
| F (offline) | 2834.58 | — | — |
| F (online) | 2836.20 | 2837.23 | 2836.20 |
| pre-processing time (secs) | 30 | — | — |
| run-time (secs) | 12 | 42 | 36 |
| total-time (secs) | 42 | 42 | 36 |
| network calls | 3 | 20 | 14 |

TABLE 2

Results for 4-well GL Network

| Allocate: 4 mmscfd | GLOPT using RND (proposed) | Amoeba (direct) | NN-Amoeba (indirect) |
|---|---|---|---|
| well-11 | 1.1396 | 1.0739 | 1.0110 |
| well-12 | 0.9315 | 0.8170 | 0.9890 |
| well-21 | 0.7404 | 0.8246 | 0.9353 |
| well-22 | 1.1885 | 1.2846 | 1.0647 |
| F (offline) | 5743.71 | — | — |
| F (online) | 5760.08 | 5764.22 | 5750.11 |
| pre-processing time (secs) | 60 | — | — |
| run-time (secs) | 19 | 201 | 111 |
| total-time (secs) | 79 | 201 | 111 |
| network calls | 3 | 59 | 18 |

TABLE 3

Results for 100-well GL Network

| Allocate: 40 mmscfd | GLOPT using RND (proposed) | Amoeba (direct) |
|---|---|---|
| F (offline) | 30098 | — |
| F (online) | 27365 | 27438 |
| difference from Amoeba result | 0.27% | — |
| pre-processing time (mins) | 25.0 | — |
| run-time (mins) | 5.02 | 153.6 |
| total-time (mins) | 30.02 | 153.6 |
| network calls | 8 | 369 |

Optimality of the Available Resource Constraint Problem

Figure 14:
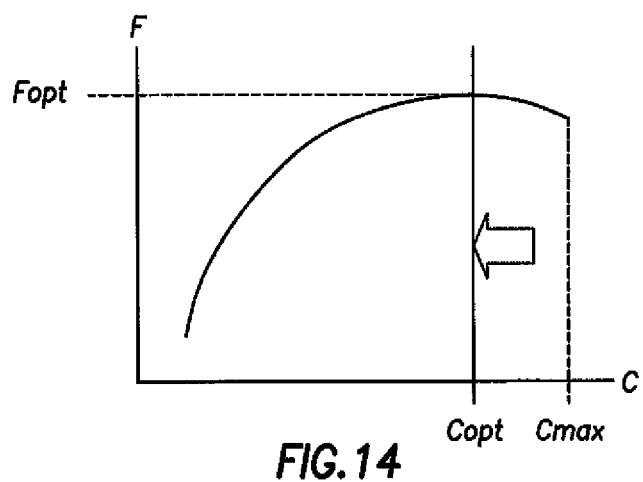
FIG. 14 depicts the variation in total flowrate (F) with the gas available (C) in accordance with one or more embodiments of the invention.

Referring to FIG. 14, the variation in total flowrate (F) with the lift resource available (C) is illustrated. In FIG. 14, the total resource available constraint is treated as an equality constraint. To ensure that there is no degradation in the production with this assumption (e.g., too much gas injected into the wells), it is necessary to assess the sensitivity of the total production flowrate with a reduction in the total resource available. If the derivative is negative, the constraining resource limit Should be reduced so as to obtain the maximum possible production. This will be done iteratively using a suitable numerical scheme until a zero derivative is obtained, identifying the maximum production rate. If the derivative is positive, then it can be reasoned that production is maximized when all the resource is applied (e.g., all available gas is injected).

Total Produced Gas Constraint

Figure 15:
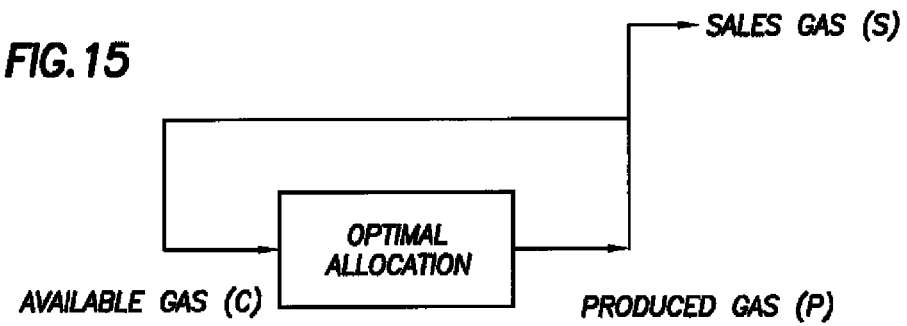
FIG. 15 depicts a gas lift network in accordance with one or more embodiments of the invention.

Referring to FIG. 15, a lifted well network is illustrated. In FIG. 15, an embodiment of a method for optimal lift resource allocation in accordance with the teachings of the present disclosure has dealt with the total gas available constraint. In alternate embodiments, the imposition of a constraint on the total produced gas (or production) (see FIG. 15) can also be handled by solving for the maximum produced gas possible. The total gas produced constraint is dealt with by minimizing the residual of the total amount of gas produced (P) and the constraint on the amount of gas produced ($P_{con}$). That is, $R(P)=P-P_{con}$. Evidently, if the total produced gas constraint is set as the available gas, the amount of gas produced will exceed the aforementioned constraint. This forms the right hand bracket of the residual function. A value of half the total produced gas constraint is set as the available gas for the left hand residual solution, completing the bracket for the constrained solution. A combined bisection and secant procedure is employed to reduce the bracket size and isolate the solution.

Figure 16:
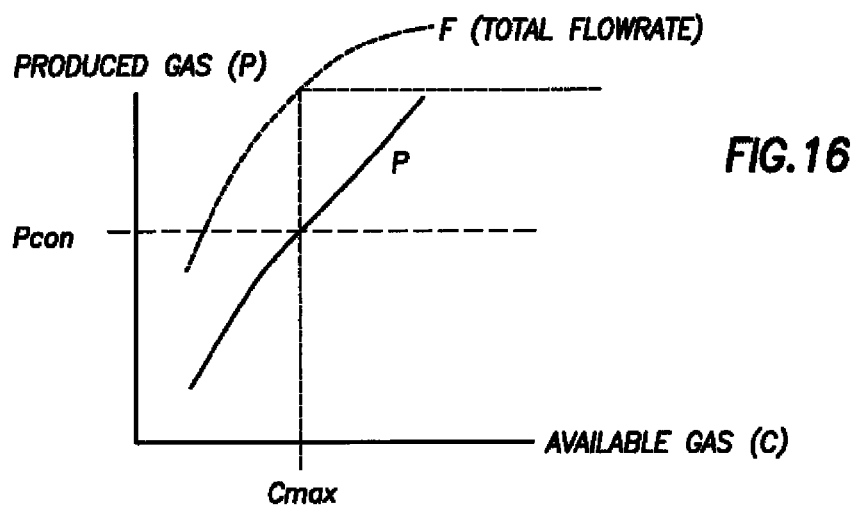
FIG. 16 depicts the total produced gas residual formation in accordance with one or more embodiments of the invention.

Referring to FIG. 16, the total produced gas residual formation is illustrated. In FIG. 16, convergence will yield the maximum production possible ($F_{max}$) given an optimal allocation of a given amount of gas ($C_{max}$) while meeting the total produced gas constraint ($P_{con}$). This approach can be similarly employed to treat global and sink level constraints. For example, a total liquid rate constraint at a sink or the total sum of flow-rates at the wells.

Optimality of the Produced Gas Constraint Problem

In the preceding section of this specification, the total gas produced constraint is solved as an equality. It is not strictly true, however, that maximum production arises when the total gas produced constraint is met as a result of injecting the most gas possible and limiting the additional gas produced at the sink. Hence, as for the total available gas constraint problem, it is necessary to assess the sensitivity of the production rate with a decrease in the total gas produced constraint.

Figure 17:
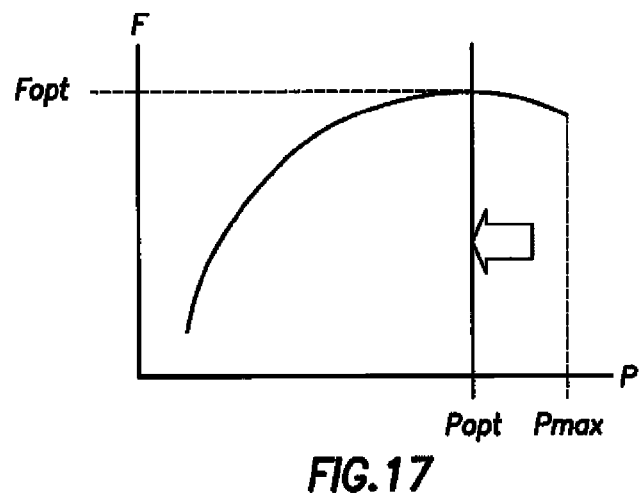
FIG. 17 depicts the variation in total flowrate (F) with the gas produced (P) in accordance with one or more embodiments of the invention.

Referring to FIG. 17, the variation in total flowrate (F) with the gas produced (P) is illustrated. In FIG. 17, if the derivative is negative, a solution will be sought that maximizes the total production possible by reducing the total produced gas constraint iteratively with a suitable line search procedure. If the derivative is positive, the identified solution is the optimal solution. That is, by producing gas at the constraint limit, the overall production is optimized.

Local Constraint Handling

Below are procedures for local constraint handling. Each procedure may be used with differing levels of performance based on the amount of gas available and the type of data and model used.

Procedure 1: The 'total available gas' constraint and the 'total produced gas' constraint are both global constraints. They act on the entire network model. Local constraints, on the other hand, are those constraints, which act locally at the well level. This section of the specification describes the approach for handling local constraints on the lift performance curve of a given well. In particular, the imposition of minimum injection ($L_{min}$), minimum flowrate ($Q_{min}$), maximum injection ($L_{max}$) and maximum flowrate ($Q_{max}$) are considered. These constraints can be applied in any number or combination thereof with respect to an individual well.

The constraints are managed with two key developments. The first is curve shifting in which the operating curve is shifted towards the left to account for a fixed quantity of injection. The second is curve modification in which the operating curve is modified about a given control point. Invariably, this control point is the intersection of the operating curve with a linear flowrate constraint.

The four constraints can be categorized into those yielding lower operating limits ($L_{min}$ and $Q_{min}$) and those which yield upper operating limits ($L_{max}$ and $Q_{max}$). With respect to the former, the operating curve is both shifted and modified (i.e., curve shifting), while the latter undergo curve modification (i.e., curve modification) only. For multiple constraints, the precedence lies in establishing the lower limits (curve shifting) prior to applying upper constraint limits by curve modification. These elements are addressed below.

The application of a minimum flowrate constraint and a minimum injection constraint is resolved to the limiting case [$L_{min}$ $Q_{min}$] on the operating curve. If $L_{min}$ is the least amount of lift gas that the well can receive, the original problem is modified to one of allocating ($C_m = C - L_{min}$) gas, where C is the total lift gas available for injection. If $L_{min}$ is pre-allocated, the lift profile for the well starts from the point [$L_{min}$ $Q_{min}$]. Hence, the curve is re-defined with a shift to the left. The curve modification procedure is used to complete the curve over the range of the normalized axis. The decreasing nature of the modification function ensures that the flowrate obtained results from the least possible amount of injection. That is, you will never inject more gas for the same amount of production. The modification function is also selected so as to maintain the monotonicity requirement of the derivative curve.

Figure 18:
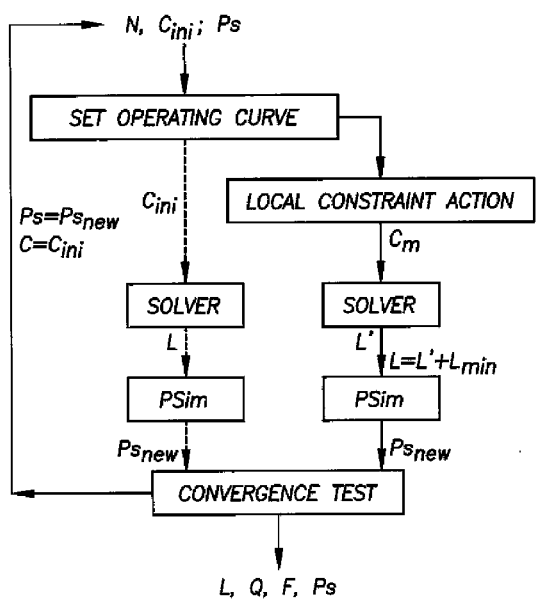
FIG. 18 depicts local constraint handling in accordance with one or more embodiments of the invention.

Referring to FIG. 18, local constraint handling is illustrated. In FIG. 18 finally, the x-axis are re-normalized, ranging from 0 to 1. The reduction of C ensures the correct problem is solved by the solver. It is imperative to add back the $L_{min}$ component to the solution from the solver before applying the lift rate to the well in the network model. See FIG. 18 for the local constraint handling procedure.

Figure 19:
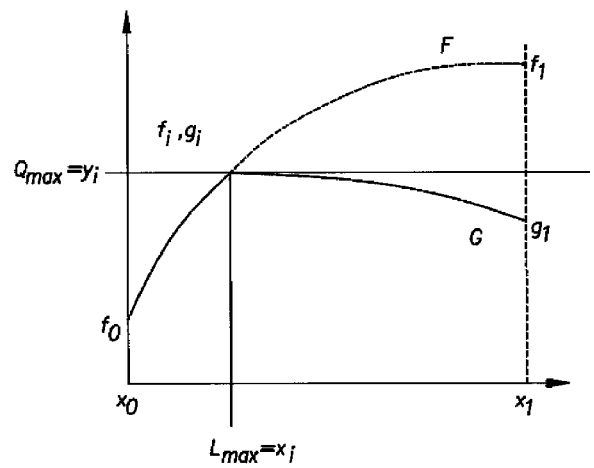
FIG. 19 depicts curve modification in accordance with one or more embodiments of the invention.
Figure 20:
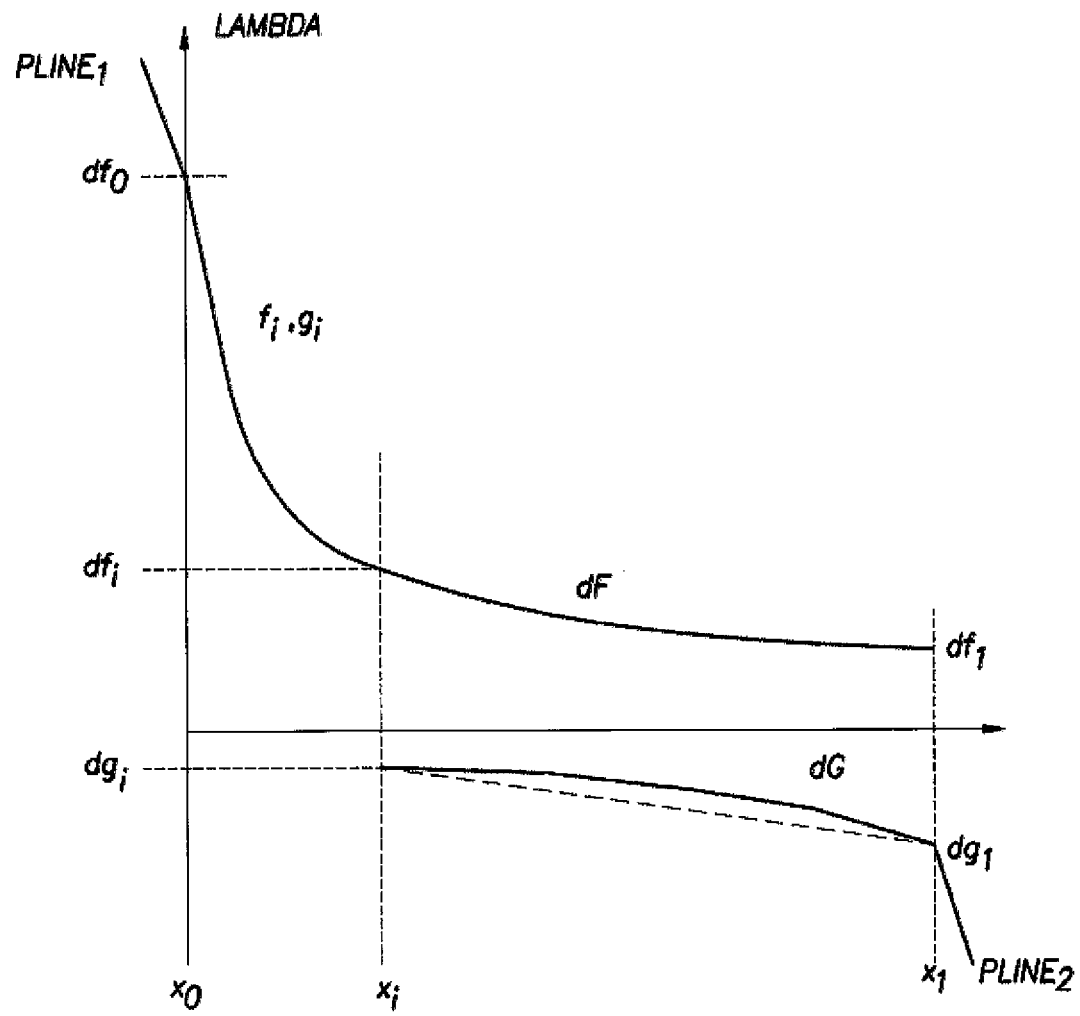
FIG. 20 depicts solving for Lambda with curve modification.

Referring to FIGS. 19 and 20, FIG. 19 depicts curve modification in accordance with one or more embodiments of the invention, and FIG. 20 depicts solving for lambda with curve modification in accordance with one or more embodiments of the invention. In FIGS. 19 and 20, the application of a maximum flowrate constraint and a maximum injection constraint is resolved to the limiting case [$L_{max}$ $Q_{max}$] on the operating curve. It is evident that to limit the flowrate to $Q_{max}$ the most that can be injected is $L_{max}$ and similarly to limit the well to $L_{max}$ constrains production to $Q_{max}$. Hence, the $Q_{max}$ or $L_{max}$ constraint can be handled in the same way using curve modification procedure by effectively penalizing the production rate (Q) for injection rates greater than $L_{max}$. See FIG. 19 and FIG. 20 for the effect on the derivative curve. The local constraint handling procedure is given in FIG. 13. Note however that, if $L_{min}$ and $Q_{min}$ constraints are applied, these are implemented first using curve shifting as discussed above.

Procedure 2 (Handling Local Constraints based on Penalty Formulation): A procedure for local constraint handling for gas lift optimization uses the Rashid's Newton Decomposition (RND) based solver. The procedure described below is able to handle a situation when large amounts of gas are made available. The updated procedure uses a penalty formulation in which each well curve is defined by bracket points (with and without local constraint assignment) and outside this bracket a penalty is assigned. Previously, the penalty was applied only if the injection bounds were exceeded. Now the correct amount of gas is allocated, the curve injection maximum and local constraints are obeyed.

The gas lift optimization procedure operates on a given lift performance curve for each well defined at a particular wellhead pressure [L v Q; Ps]. The offline optimization step using the RND solver requires the derivative curves [L v dQ; Ps] to be monotonically decreasing. This requirement is a key and is ensured by identifying the monotonically stable point ($P_{mono}$) for each current operating curve (see FIG. 21). Hence, if L allocated is less than the x-value of $P_{mono}$, the derivative is a line extended to the y-axis with a low negative gradient and linear interpolation is used to evaluate the flowrate, as shown in FIG. 21.

Once the optimal allocation procedure is completed, the network simulator is called with optimal lift rates from the offline solution and revised wellhead pressures are obtained. The operating curve of each well is suitably adjusted and $P_{mono}$ is re-established before the new offline solution is determined.

Figure 22:
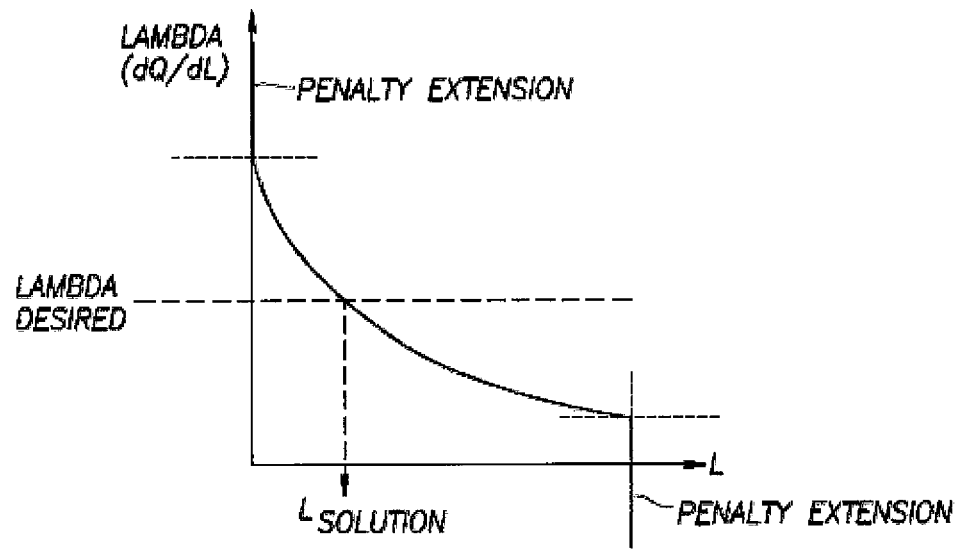
FIG. 22-23 depict exemplary derivative curves in modeling the gas lift injection allocation.

During the solution procedure, the monotonically decreasing derivative curve is solved for the lift value L for the desired value of lambda for each well, as shown in FIG. 22. Penalty line extensions are defined for very high or negative lambda values to ensure that a solution for all values of lambda is possible.

In the absence of local constraints, a bracket is defined by the minimum and maximum injection rates permissible. As the x-axis is normalized by default, the bracket is defined over the interval [$x_{min}(0)$ $x_{max}(1)$] initially, but can be reduced if local constraints are applied.

Figure 23:
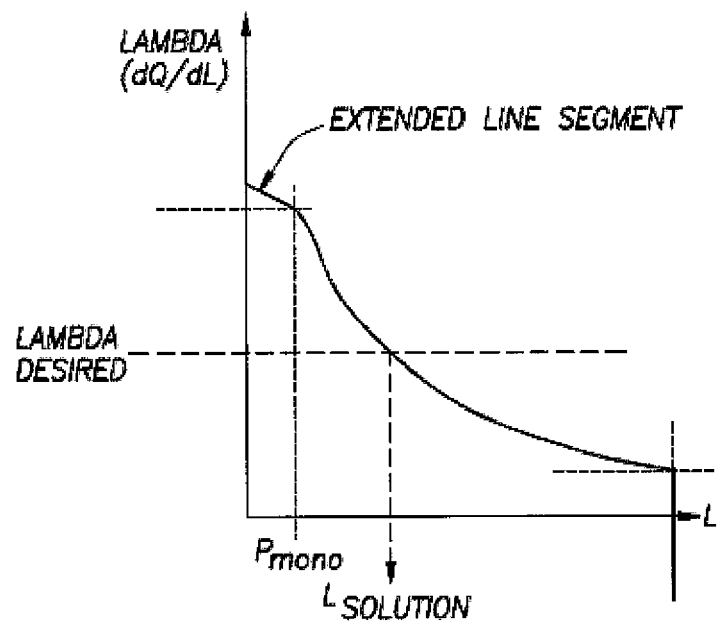

When $P_{mono}$ is not zero (FIG. 23), the LHS end point on the derivative curve is extended to the y-axis to ensure the monotonicity requirement of the derivative curve. Note that the inverse problem, finding L for a desired lambda, is solved so as to obviate the need for modeling the inverse derivative curve. Although a greater number of function evaluations are required as a result, it is better than degrading the solution quality by successive curve fitting.

This section describes a procedure for handling local constraints on the lift performance curve of a given well. In particular, the imposition of minimum injection ($L_{min}$), minimum flowrate ($Q_{min}$), maximum injection ($L_{max}$) and maximum flowrate ($Q_{max}$) are considered. These constraints can be applied in any number or combination thereof with respect to an individual well.

Note that the inverse problem (i.e., finding L for a desired lambda), is solved so as to obviate the need for modeling the inverse derivative curve. Although a greater number of function evaluations are required as a result, it is better than degrading the solution quality by successive curve fitting.

The total available gas and total produced gas constraints are both global constraints. They act on the entire network model. Local constraints on the other hand are those constraints that act locally at the well level. This section describes the procedure for handling local constraints on the lift performance curve of a given well. In particular, the imposition of minimum injection ($L_{min}$), minimum flowrate ($Q_{min}$), maximum injection ($L_{max}$) and maximum flowrate ($Q_{max}$) are considered. These constraints can be applied in any number or combination thereof with respect to an individual well.

Figures 24, 25:
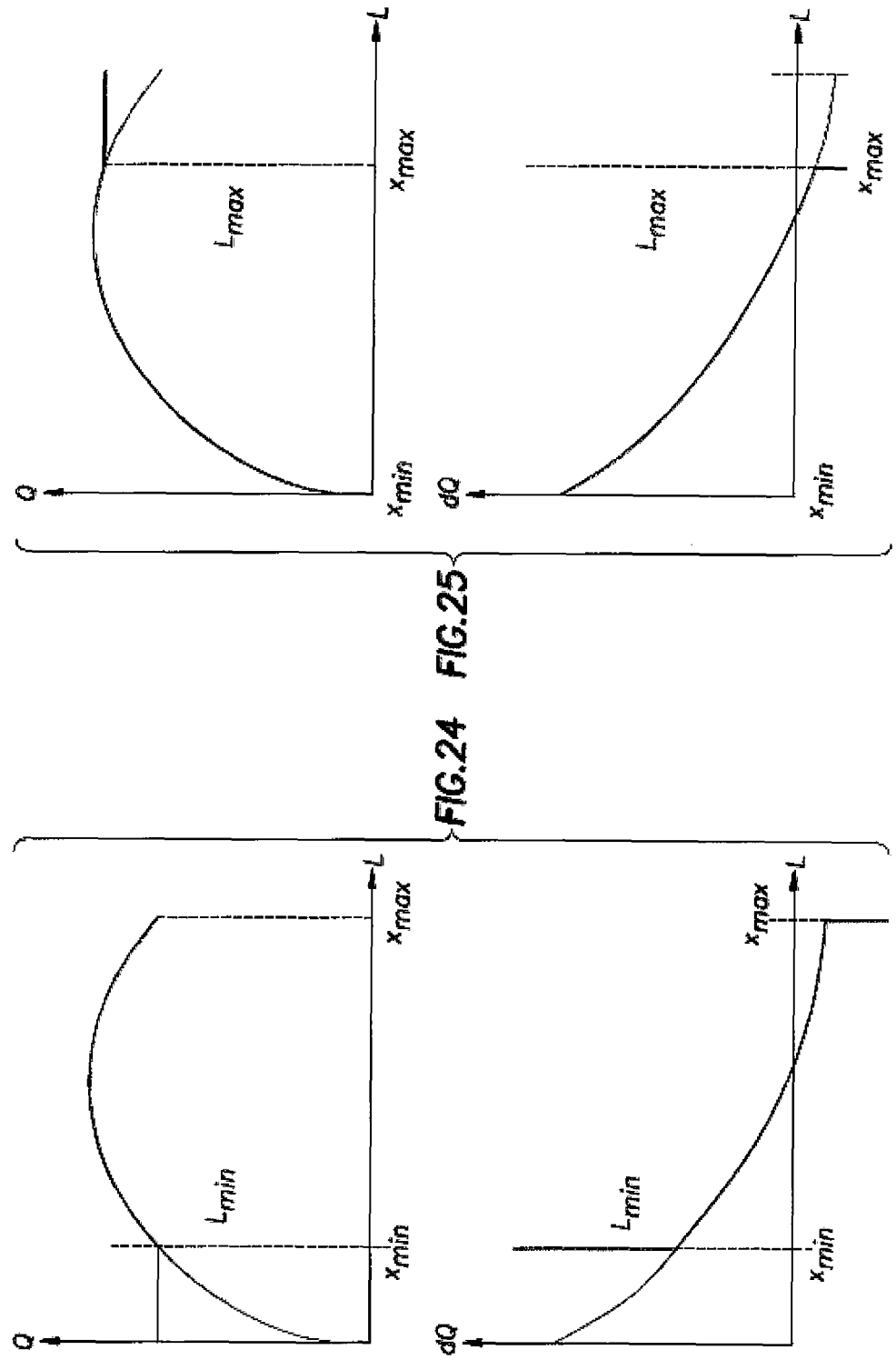
FIGS. 24-29 depicts exemplary derivative curves in modeling the gas lift injection allocation under various local constraints.

In FIG. 24, the minimum injection constraint reduces the feasible bracket [$x_{min}$ $x_{max}$] in accordance with one or more embodiments of the invention. The derivative profile is penalized outside this range and the operating profiles are shown in bold in FIG. 24.

In FIG. 25, the maximum injection constraint reduces the feasible bracket [$x_{min}$ $x_{max}$] in accordance with one or more embodiments of the invention. The derivative profile is penalized outside this range and the operating profiles are shown in bold in FIG. 25.

Figures 26, 27:
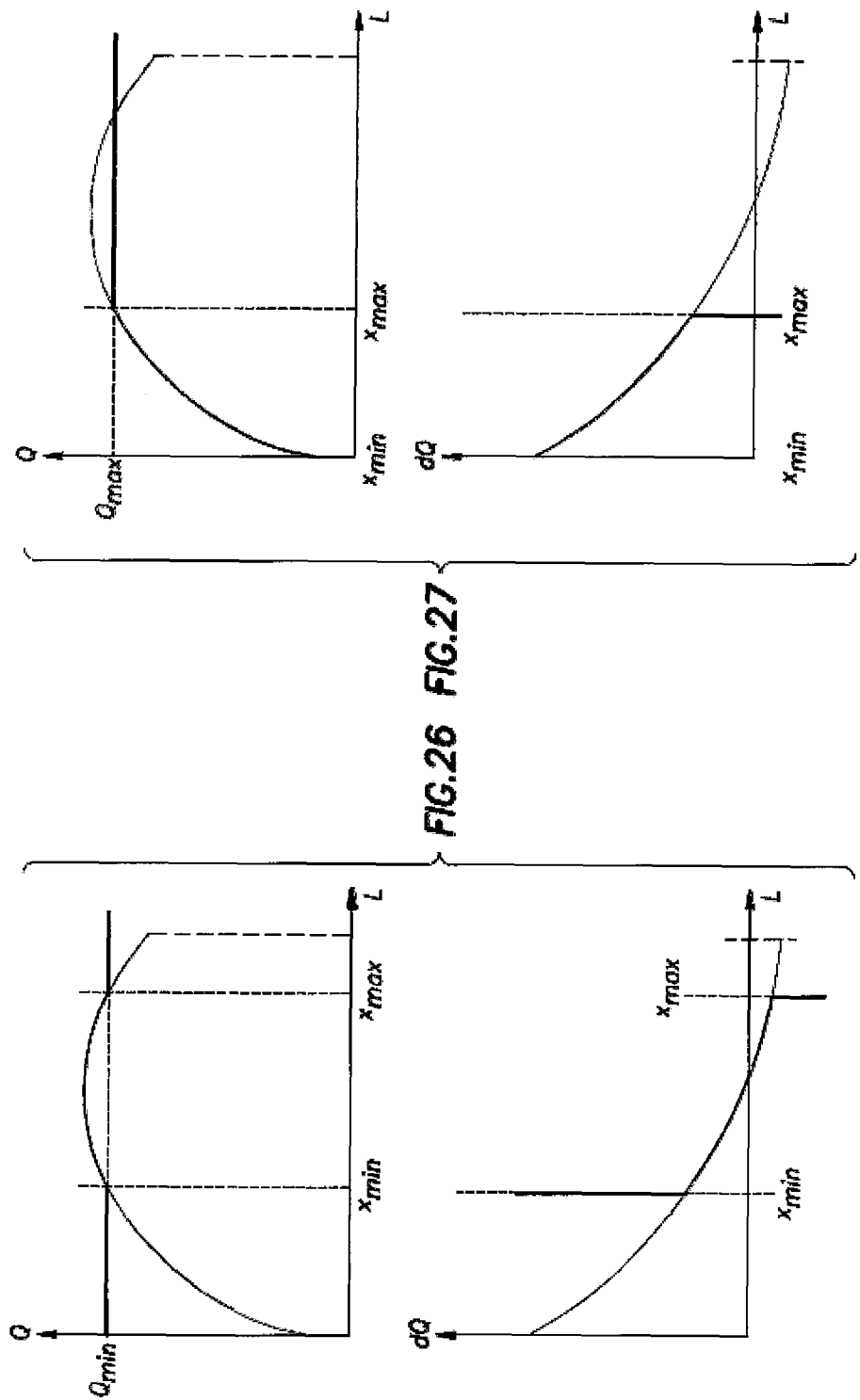

In FIG. 26, the minimum flowrate constraint is resolved to a minimum and maximum injection constraint in accordance with one or more embodiments of the invention. The latter results if the lift profile is not monotonically increasing. The feasible bracket is [$x_{min}$ $x_{max}$] and the derivative profile is penalized outside this range. The operating profiles are shown in bold in FIG. 26. Note, if $Q_{min}$ specified is less than the minimum production level ($Q_{min} < F_{min}$) then the constraint is inactive. Further note, if $Q_{min}$ specified is greater than the maximum production level ($Q_{min} > F_{max}$) then the constraint cannot be met and is omitted.

In FIG. 27, the maximum flowrate constraint is resolved to a minimum injection constraint in accordance with one or more embodiments of the invention. Strictly speaking, if lift profile is not monotonically increasing, then the lift profile is feasible after the second root. However, if it is assumed that the solution with the lowest injection rate is always desired, the right hand portion of the lift profile can be neglected. The feasible bracket is [$x_{min}$ $x_{max}$] and the derivative profile is penalized outside this range. The operating profiles are shown in bold in FIG. 27. Note, if $Q_{max}$ specified is less than the minimum production level ($Q_{max}<F_{min}$) than the constraint cannot be met and is omitted. Further note, if $Q_{max}$ specified is greater than the maximum production level ($Q_{max}>F_{max}$) then the constraint is inactive.

Figure 28:
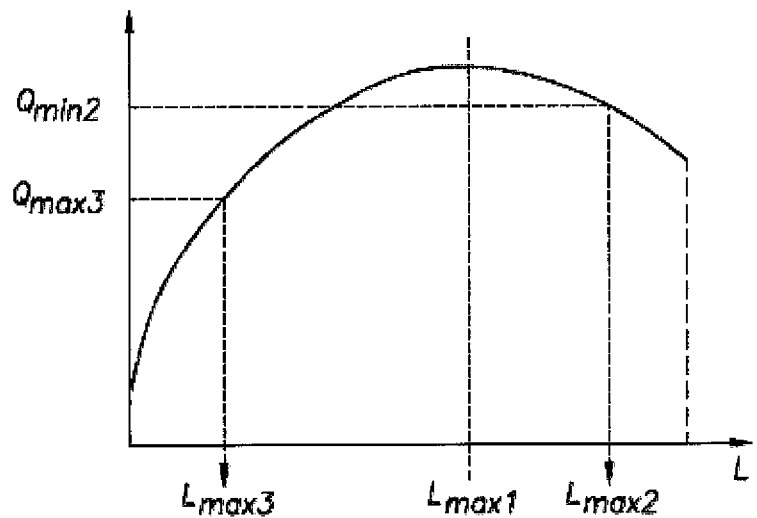

In the preceding section, it is shown that Lmax and Qmax constraints reduce to a maximum injection constraint. A Qmin constraint can also introduce a maximum injection constraint if the curve is non-monotonic. If each of these constraints is applied, the limiting case is selecting as min ($L_{max1}$, $L_{max2}$, $L_{max3}$) (e.g., see FIG. 28).

Figure 29:
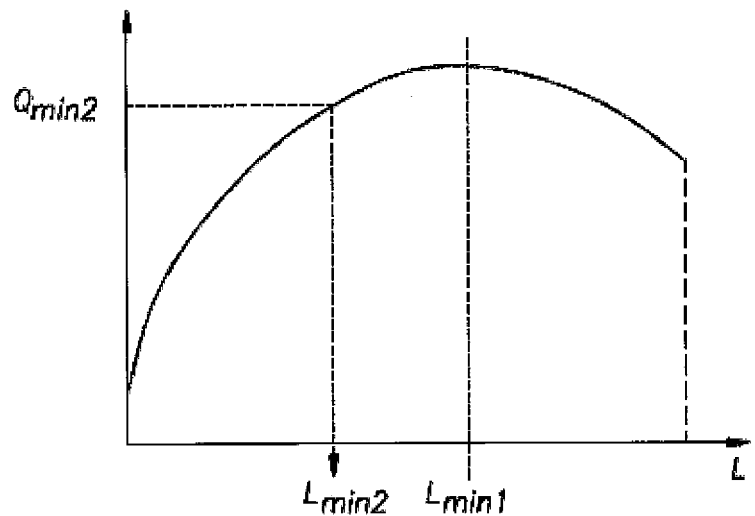

A $Q_{min}$ constraint will also necessarily introduce a minimum injection constraint. Alongside a $L_{min}$ constraint, the limiting case is selected as max($L_{min1}$,$L_{min2}$) (e.g., see FIG. 29). In the aforementioned cases, once the limiting injection rates have been established, the feasible range and the derivative profile can be suitably defined. The solution proceeds as previously described.

Note that caution must be taken by the user to prevent conflicting and unsatisfactory constraints. That is, to prevent the limiting minimum injection rate from being greater than the limiting maximum injection rate [$x_{min}>x_{max}$]. At present, a warning is given and the in the interests of solution preservation, the bounds are reversed such that the bracket [$x_{min}$ $x_{max}$] remains feasible. Alternately, a constraint hierarchy could be stated to manage the importance of the constraints defined.

Secondary or Related Constraints

Secondary constraints are those that are related to the lift performance curve by some given relationship. For example, GOR and WC set as a fraction of the production liquid rate Q can be used to modify the given operating curve for $Q_{water}$, $Q_{gas}$ or $Q_{oil}$ local constraints. In this case, we can convert the problem to an equivalent $Q_{max}$, $Q_{min}$, $L_{max}$ or $L_{min}$ constrained problem as indicated above.

Zero Injection

Remove the well from the allocation problem. Solve the sub-problem of M-wells, where (M=N−1). Alternately, using the penalty formulation described, set $x_{min}=x_{max}=0$.

Shut-In Prevention

In order to prevent a well from being shut-in, set a default $Q_{min}$ local rate constraint. This could be applied at the outset or implemented as a preventative measure if a network simulator (such as PipeSim) returns a shut-in well solution.

$L_{set}$ Constraint

Force the well to receive $L_{set}$. Remove the well from the allocation procedure. Reduce the total gas available for allocation: $C_m=C-L_{set}$. Solve the sub-problem of M-wells, where (M<N). Alternately, using the penalty formulation described, set $x_{min}=x_{max}=L_{set}$.

Multiple Local Constraints

Resolve each active constraint for the most limiting case. Use curve shifting for $L_{min}$ and $Q_{min}$ type constraint. Use curve modification for $L_{max}$ and $Q_{max}$ type constraint. Use the procedure outlined above to resolve these constraints.

Auxillary Global Constraints

Global constraints acting on the sink can be handled as per the total produced gas constraint problem. A residual function is formed such that the constraint value minus the desired value is zero. A range of solutions might be required to identify the true optimum with regard to the inequality.

Tertiary Constraints

Tertiary Constraints are those that do not have a direct relationship to the lift curves, such as constraints on a manifold. These constraints cannot be managed implicitly within the solver. The solver will yield a solution and the intermediary constraint can only evaluated by calling the network model.

Corrective action must then be assigned for each particular type of local constraint employed. Hence the type and order of action required to resolve the constraint, such as reduction of lift gas or the use of control valves, must be defined a priori. Alternately, a more apt solver, such as the alternative genetic algorithm solver, should be employed. An implementation of a continuous float point genetic algorithm has been used for this purpose.

Manifold Liquid Rate Constraints

See Tertiary constraint handling, as given above. The original problem is solved and the manifold constraint is tested. If it is feasible no further action is required. If the constraint is active, the optimal amount of gas permissible in the sub-network containing the wells which are upstream of the manifold constraint is established. The difference between the original allocation and the optimal allocation to this sub-network is re-distributed to the remaining sub-network. The real network model is called and the manifold constraint is tested. The difference between the offline constraint active solution and the online constraint inactive solution provides a slack in the offline manifold constraint level. This manifold constraint is increased for the offline solution so as to effectively reduce the slack between the offline and online constraint level and further maximize the network production. An iterative approach is necessary for multiple manifold constraint handling. This approach requires the identification of upstream wells, which can become complicated for large looped networks.

A functional description of the operation of the optimal allocation procedure for production optimization (20) of FIGS. 5 and 7 adapted for practicing the method for optimal lift resource allocation will be set forth in the following paragraphs with reference to FIGS. 5 through 17 of the drawings.

In FIG. 5, when the processor (12) of the computer system (10) executes the "optimal allocation procedure for production optimization" (20) stored in the memory (16), the processor (12) may execute steps 20.1 through 20.6 of FIG. 7. As a result, when the processor (12) executes steps 20.1 through 20.6 of FIG. 7, the following functional operation is performed by the computer system (10) of FIG. 5.

The processor (12) executes the optimal allocation procedure for production optimization (20) of FIG. 7 and performs a method for optimal lift resource allocation, which includes optimally allocating lift resource under a total lift resource constraint or a total produced gas (or production) constraint, the allocating step including distributing lift resource among all lifted wells in a network so as to maximize a liquid/oil rate at a sink.

An embodiment of, the optimal allocation procedure for production optimization (20) of FIG. 5 is shown in FIG. 7. In this embodiment, the optimal allocation procedure for production optimization (20) includes an offline-online optimization procedure, which makes use of pre-generated lift performance curves, in a pre-processing step (step 20.1 of FIG. 7). The offline problem can be solved with any suitable NLP (Non-Linear Programming) solver in order to solve the n-variable, inequality constrained problem. In addition, the optimal allocation procedure for production optimization (20) of FIG. 7 may use a novel Newton-decomposition approach, during step 20.3 of FIG. 7, to solve the offline problem. This results in a problem of a single variable with a linear equality constraint.

In FIG. 7, a virtual network simulator can be employed to generate curves or to run the network for the online solution using the lift resource allocations from the offline solution if desired. Embodiments of the allocating step (that is, the step of optimally allocating constrained resource under a total lift resource constraint or a total produced gas (or production) constraint) may include: using lift performance curve data generated at a pre-processing step to solve lift resource allocation, using Newton decomposition to convert N-wells and linear inequality into one of a single variable with a linear equality constraint, and running a network simulator to determine if a solution is in agreement with an actual network model for the wellhead pressures at each well. In further embodiments, the allocating step (that is, the step of optimally allocating lift resource under a total lift resource constraint or a total produced gas (or production) constraint) may further include: using an offline-online optimization procedure, the offline-online optimization procedure including: extracting lift performance curves, solving an offline optimal allocation procedure to determine an optimal allocation of lift resource rates ($\hat{L}$), solving a real network problem including a plurality of wells using the optimal allocation of lift resource rates ($\hat{L}$) to obtain a production value at a sink $F_{nw}$ and updated well head pressures at each of the wells ($P_s$), and repeating the offline optimal allocation procedure using the updated well head pressures.

Recalling that a fully working network model includes a plurality of wells, and referring to steps 20.1 through 20.6 illustrated in FIG. 7, in some embodiments, the allocating step (that is, the step of optimally allocating lift resource under a total lift resource constraint or a total produced gas constraint) may further comprise: (a) in a pre-processing step, generating a plurality of lift performance curves for each well in the network adapted for describing an expected liquid flowrate for a given amount of gas injection at given wellhead pressures; (b) assigning for each well in the network an initial wellhead pressure ($P_N$) adapted for setting an operating curve for said each well; (c) in response to the initial wellhead pressure ($P_N$) assigned to each well in the network implementing an allocation procedure including optimally allocating a lift resource ($\hat{L}$) among N-wells according to a total lift resource constraint (C) so as to maximize a total flowrate ($F_{RND}$); (d) on the condition that said allocation procedure is completed, calling the real network model with the optimal lift resource values ($\hat{L}$) assigned to the wells of the of the network model; and (e) repeating steps (a) through (d) until there is convergence between old estimates and new estimates of the wellhead pressure for all of the wells in the network model.

Gas lift optimization, in some embodiments, may be further enhanced by one or more of the following techniques: (1) add dynamic minimum flow constraints to ensure well stability; (2) apply techniques to dual string wells; (3) apply techniques to riser-based gas lift for deepwater wells; and (4) connecting injection networks. Each is described below.

Dynamic Minimum Flow Constraints to Ensure Well Stability

The Alhanati envelope and penalty function may be used to determine the stability for a well. Specifically, the well curve calculation by a network simulator, such as Pipesim, provides information about the Alhanati criteria values, which is converted into a minimum gas lift flowrate or minimum liquid flowrate and then used for the optimization. Where a constraint is set very low, logic is put in place to shut-in wells and redirect lift gas, e.g., problem occurs when the maximum flowrate is set below the total rate of the wells on minimum gas lift.

Dual String Wells

It is possible to take the individual well tubing performance curves and, when the CHP is identical, add them together to calculate a pseudo-well performance curve for dual string wells. Next, a back-out of the gas lift rates for the wells is performed. Identification of dual string wells and determining when to switch off a string if one string is closed may also be necessary.

Riser-Based Gas Lift for Deepwater Wells

In addition to gas lift being added into the individual wells which are manifolded together into a subsea flowline, gas lift optimization may also be added to the bottom of the riser (i.e., in the middle of the network). The optimization is used to balance the injection at the bottom of the riser with that to the wells based on a split of the available gas lift.

Connect Injection Networks

The network may be solved so that the flowrate boundary conditions are taken from the gas lift optimizer (i.e., rate to be injected to the well). The calculated gas lift pressure is then passed to the production well in the form of a casing head pressure constant.

In addition to the connections listed above, the pressure from outlet of the gas compressors in Hysys may be used to feed a gas lift injection pressure constraint in the production network case. In this case, a need may exist to iterate to balance the solution, as the constraints are not known on the first pass through the solver.

In addition to the connections listed above, the actual gas volumes may be passed through the connector back from Hysys to Pipesim. Specifically, control valves in Hysys may be used to regulate the required pressure drop back into the Pipesim model.

Generally speaking, gas lifted wells require constant attention and optimization to work properly. One or more embodiments of the invention described above include optimization schema for managing the complexity of network constraints and compressor plant capacity in gas lift operation. One or more embodiments of the invention described below continuously perform such optimization schema for ever-changing field and individual well conditions.

Figure 30:
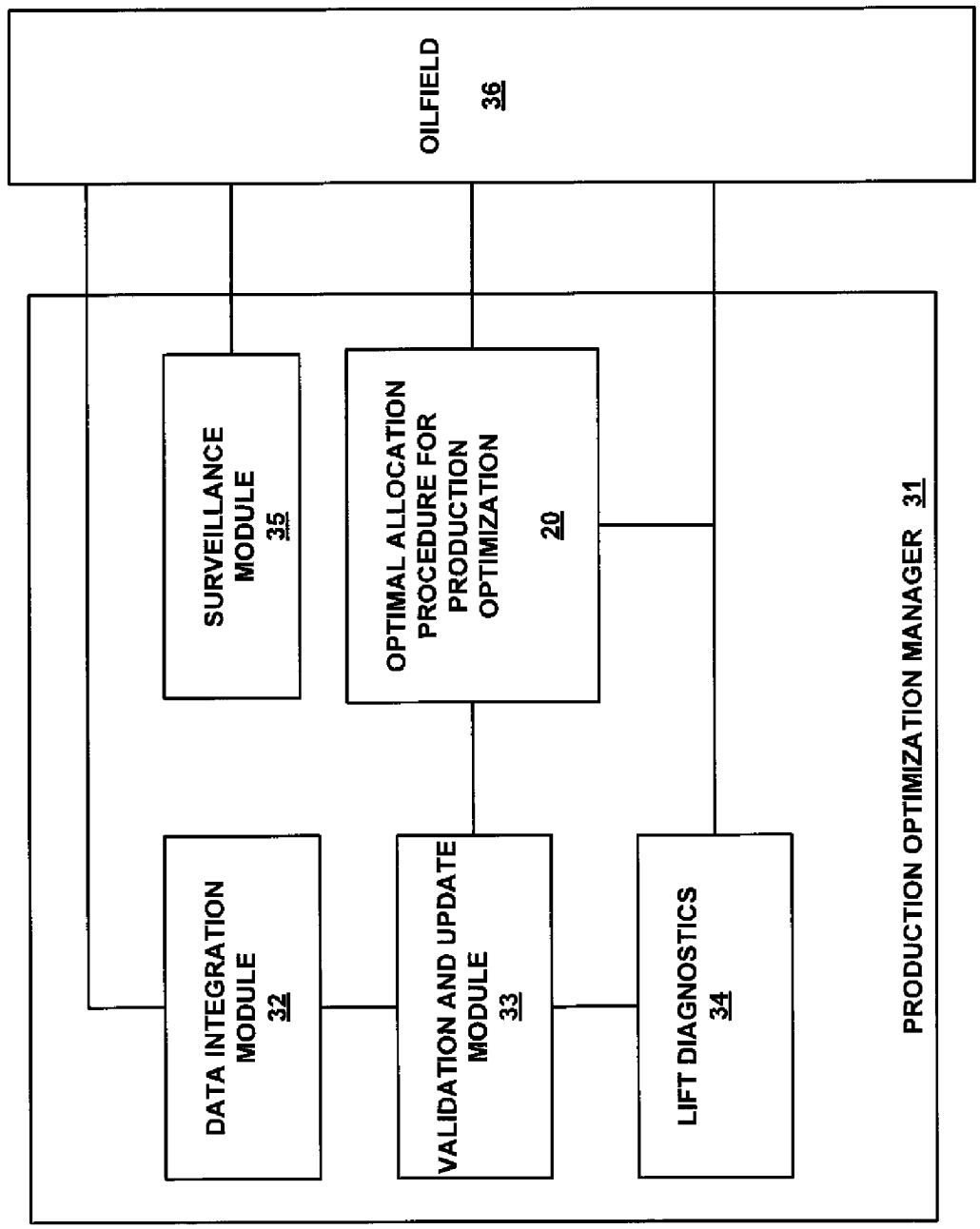
FIG. 30 depicts a schematic block diagram of a production optimization manager for an oilfield operation in accordance with one or more embodiments of the invention.

FIG. 30 is a schematic block diagram depicting a production optimization manager (31) for operations of an oilfield (36) such as an artificial lift operation. Those skilled in the art, having the benefit of this detailed description, will appreciate the components shown in FIG. 30 may differ among embodiments of the invention, and that one or more of the components may be optional. In one or more embodiments of the invention, one or more of the components shown in FIG. 30 may be omitted, repeated, supplemented, and/or otherwise modified from that shown in FIG. 30. Accordingly, the specific arrangement of components shown in FIG. 30 should not be construed as limiting the scope of the invention.

As shown in FIG. 30, the production optimization manager (31) includes a data integration module (32), a validation and update module (33), a lift diagnostic module (34), the optimal allocation procedure for production optimization (20), and a surveillance module (35). The data integration module (32) obtains well test data from a wellsite (e.g., corresponding to well_11, well_12, well_21, and/or well_22 of FIG. 6 above) in accordance with one or more embodiments of the invention. The validation and update module (33) validates the well test data and updates a corresponding well model (not shown) in a network model (not shown) representing a portion of the oilfield (36) (e.g., for modeling the network of FIG. 6 above) in accordance with one or more embodiments of the invention. The lift diagnostic module (34) diagnoses a lift configuration (e.g., various lift operation parameters, such as gas lift valve position, operating pressures, gas injection rate, etc.) of the wellsite based on the validated well test data and the updated network model in accordance with one or more embodiments of the invention. The optimal allocation procedure for production optimization (20) optimally allocates lift resource for the wellsite to maximize a production rate at a sink of the network in accordance with one or more embodiments of the invention. One embodiment of the optimal allocation procedure for production optimization (20) is described in detail with respect to FIGS. 5 and 7 above. The surveillance module (35) monitors the production rate of the network and generates an alarm when the production rate deviates from a projected production rate to exceed a pre-determined threshold.

The production optimization manager (31) may be implemented in the computer system (10) of FIG. 5, which may be connected to a local area network (LAN) or a wide area network (e.g., the Internet) (not shown) via a network interface connection (not shown). Further, those skilled in the art will appreciate that one or more elements of the aforementioned computer system (10) may be located at a remote location and connected to the other elements over a network. Further, the invention may be implemented on a distributed system having a plurality of nodes, where each portion of the invention (e.g. the optimal allocation procedure for production optimization (20) or any other components of the production optimization manager (31)) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Those skilled in the art will appreciate that various components in the computer system (10) may take other forms than shown in FIG. 5, now known or later developed.

In one or more embodiments of the invention, the production optimization manager (31) supports gas lift optimization workflows within shared console environments and has the flexibility to adapt to client operations. In one or more embodiments of the invention, the production optimization manager (31) schedules gas lift optimization workflows with any required frequency, for example to work online 24 hours a day, 7 days a week.

Figure 31:
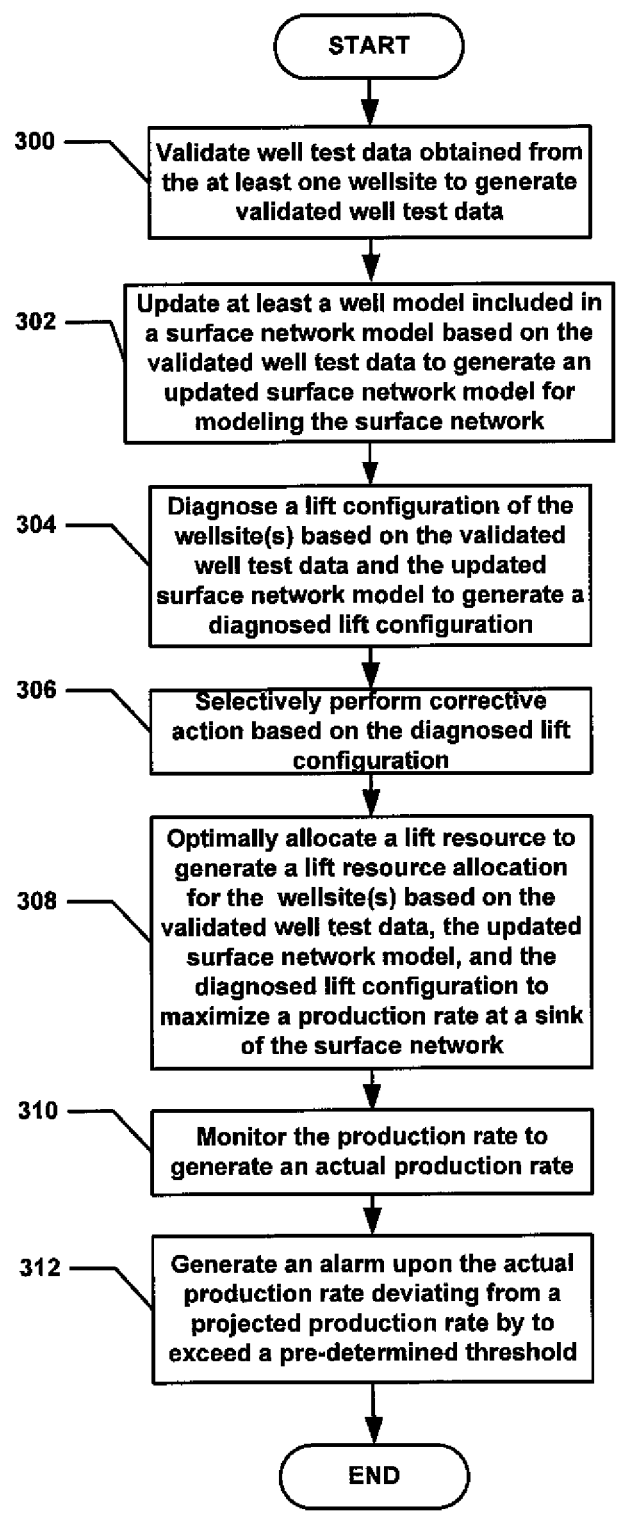
FIG. 31 depicts a flow chart of an optimization method for an oilfield operation in accordance with one or more embodiments of the invention.

FIG. 31 is a flow chart of an embodiment of an optimization method for an oilfield operation in accordance with the teachings of the present disclosure. The oilfield includes at least one wellsite operatively connected to a surface network. The process shown in FIG. 31 may be used, for example, by the production optimization manager (31) to optimize operations of the oilfield (36). Those skilled in the art, having the benefit of this detailed description, will appreciate the sequence of actions shown in FIG. 31 may differ among embodiments of the invention, and that one or more of the actions may be optional. In one or more embodiments of the invention, one or more of the actions shown in FIG. 31 may be omitted, repeated, and/or performed in a different order than that shown in FIG. 31. Accordingly, the specific arrangement of actions shown in FIG. 31 should not be construed as limiting the scope of the invention.

Initially, well test data are obtained from at least one wellsite to generate validated well test data (at 300). In one or more embodiments of the invention, the data integration module (32) performs data integration to allow access to current field data, such as well test data (e.g., oil rate, gas rate, water rate, water cut, gas-oil ratio (GOR), choke setting, fluid properties, etc.). In one or more embodiments of the invention, the data integration module (32) acquires data automatically on a pre-defined schedule from various data sources including but not limited to data acquisition systems (e.g., SCADA (Supervisory Control and Data Acquisition)) and other data stores. The data may include raw data and/or parameters calculated from raw data. The pre-defined schedule may be determined based on the frequency of the data being available and/or rules set up that dictate the required frequency of data update. In one or more embodiments of the invention, the data stores may include flat files (e.g. various formats of spreadsheet, ASCII, XML, etc.), operational data stores (e.g., relational database, object oriented database, etc.), etc. In one or more embodiments of the invention, data conditioning and quality checking is performed during data acquisition. In one or more embodiments of the invention, data conditioning and quality checking is performed as a subsequent process. In one or more embodiments of the invention, data conditioning and quality checking is performed automatically. In one or more embodiments of the invention, data conditioning and quality checking involves manual procedures is performed by a user (e.g., an engineer entering missing data or revising incorrect data). Accordingly, validated data is made available for use by other workflows in the production optimization manager (31). In one or more embodiments of the invention, the production optimization manager (31) may include workflow results visualization to display the success of the data acquisition process by the data integration module (32) to the user.

As shown in FIG. 31, at 302, at least a well model comprised in a network model is updated based on the validated well test data to generate an updated network model for modeling the network comprising the at least one wellsite and the surface network. As described with respect to FIG. 6 above, the network model includes a topological description of the network, the boundary constraints at sources and sinks, the compositions of the fluids in the wells, and the allocation of the lift resources (e.g., flow correlations employed and the level of gas injected into the wells). In one or more embodiments of the invention, available lift resources may be considered as control variables to the allocation process while all other elements may be considered as static network parameters with respect to the use of the network model by the optimal allocation procedure for production optimization (20). In one or more embodiments of the invention, the validation and update module (33) updates these static network parameters of the network model based on the validated data. In one or more embodiments of the invention, the validation and update module (33) updates the well model comprised in the network model based on the validated well test data. In one or more embodiments of the invention, the artificially lifted wells continue to operate in production while the validation and update module (33) updates corresponding well models dynamically.

Generally speaking, a well model is only as good as the data contained therein. For example, from time to time, a new well test may be conducted for a well, the user may analyze and confirm (e.g., using tabular displays and/or graphs) if new well test data represents a change in well performance (e.g. increasing water cut, GOR, etc.). If a parameter value is not available from data acquisition or appears suspicious, sensitivity analysis using the well model may be performed to allow the user to predict the value of a certain parameter based on the other parameters of the well test. If the user confirms through the well test data analysis that the well performance has indeed changed, the well model may then be updated with the parameters from the new well test data.

At 304, a lift configuration of at least one wellsite is diagnosed based on the validated well test data and the updated network model to generate a diagnosed lift configuration. Once the well model has been updated with the most current well test information, the next step is to perform a gas lift diagnostic on the well to ensure it is making efficient use of its allocated lift gas. The diagnostic calculation utilizes the current available injection pressure and determines which gas lift valves are open and what the resulting production rate should be. In one or more embodiments of the invention the well model includes lift configuration (i.e. various parameters for performing the artificial lift operation, such as positions of the gas lift valves, operating pressures, gas injection rates, etc.) based on the available reservoir energy and the configuration of the well. In one or more embodiments of the invention, the lift diagnostic module (34) verifies whether a gas lift valve operates as configured to inject gas at the desired timing based on currently available injecting pressure at the surface. In one or more embodiments of the invention, the lift diagnostic module (34) verifies whether gas is being injected into the desired valve(s) based on current operating conditions (e.g., flow correlations employed and the level of gas injected into the wells). In one or more embodiments of the invention, the lift diagnostic module (34) generates a diagnosed lift configuration, which either confirms the current configuration or contains revised configuration for proper lift operations.

In one or more embodiments of the invention, the diagnostic may be run manually by the user from a workstation. In one or more embodiments of the invention, the diagnostic may be run automatically as a batch workflow on a server without user interaction. In one or more embodiments of the invention, this diagnostic workflow may be performed for a single well. In one or more embodiments of the invention, this diagnostic workflow may be performed for multiple wells concurrently. In one or more embodiments of the invention, the production optimization manager (31) may include workflow results visualization to display the diagnostics result (e.g., the diagnosed lift configuration) to the user. In one or more embodiments of the invention, the diagnostics results of multiple wells are displayed with a ranking such that the user may examine multiple wells at the same time to identify and prioritize those requiring further actions.

In one or more embodiments of the invention, corrective action may be selectively performed (at 306). For example, based on the diagnosed lift configuration, the well model may be further updated or the physical well may be worked over to ensure correct lift configuration for current field conditions. In one or more embodiments of the invention, the current deepest injection point calculated in this diagnostic workflow may be used in the next optimization workflow.

At 308, lift resource is optimized to generate a lift resource allocation for the at least one wellsite based on the validated well test data, the updated network model, and the diagnosed lift configuration to maximize a production rate at a sink of the network. Once the well models have been updated and any performance issues addressed with the diagnosed lift configuration, the well models are uploaded into the network model for use in a gas lift optimization workflow. In one or more embodiments of the invention, the gas lift optimization workflow utilizes the optimal allocation procedure for production optimization (20) described above. In one or more embodiments of the invention, the gas lift optimization workflow maybe configured to allow the user to set the global or local constraints, change the on/off status of wells, run the PIPESIM model in prediction mode to compare its calculated flowrates to currently measured flowrates for validation, trigger the gas lift optimization using the current data, retrieve and display the results from the optimization and optionally save the scenario for a later assessment.

In one or more embodiments of the invention, fast-loop (e.g., daily) optimization workflows may be performed to optimize production thereby reduce gas injection requirements in the gas lift network while satisfying well and network constraints. In one or more embodiments of the invention, optimal gas injection rate for each well is estimated while taking into account all network interactions. In one or more embodiments of the invention, optimal set points may be determined based on the recommended injection rates. The optimal set points (e.g., injection rates, choke settings) are settings for gas lift equipments such as gas lift valves or other downhole/surface equipments controlled according to the lift configuration.

In one or more embodiments of the invention, these optimal set points may be published (or broadcasted) to the user (e.g., production control operators) for controlling the oilfield operations. For example, these values may be published via an OPC (Object Linking and Embedding for Process Control) server, which may in turn be linked into advisory tags in the SCADA system, allowing tight integration of the optimized results with the physical operations. Alternatively, these set points may be delivered through a surveillance gas lift widget for display in a remote engineering desktop or using a thin web client. These set points may be displayed in tabular or graphical formats, and optionally with alarms and key performance indicators (KPI's), as the basis for user to control the gas lift equipments. In one or more embodiments of the invention, these optimal set points may be published to control the gas lift equipments directly, for example via OPC standards.

Based on the method steps described above, gas lift operations may be monitored using automatic and/or manual surveillance to track the actual production rate at 310. For example, the production optimization manager (31) may be configured to provide necessary tools for the user to assess the current system status manually or receive notifications of abnormal conditions automatically. In one or more embodiments of the invention, these notifications may be delivered to the user workstation through a desktop widget visually present on the workstation desktop to receive regular information updates based on user subscription.

In one or more embodiments of the invention, automatic surveillance may be accomplished based on pre-configured rules that run automatically in response to the acquisition of new well test data. These pre-configured rules may be configured for detecting new available well test data, classifying (e.g., as valid or invalid) these new well test data, determining well status (e.g., as currently on or off), and monitoring key parameters to assess proper system operation. In one or more embodiments of the invention, alarm thresholds may be embedded in the pre-configured rules to automatically detect abnormal deviations.

In one or more embodiments of the invention, manual surveillance may be accomplished based on pre-defined display graphs provided to the user for assessing the proper operation and the status of the gas lift operation. In one or more embodiments of the invention, alarm thresholds may be incorporated in the pre-defined display graphs for user to manually identify abnormal deviations.

As described above, an alarm is generated upon the actual production rate deviating from a projected production rate to exceed a pre-determined threshold (at 312). In one or more embodiments of the invention, the projected production rate is generated by the updated network model based on the diagnosed lift configuration and the lift resource allocation. In one or more embodiments of the invention, the validated well test data, the updated network model, the diagnosed lift configuration, the lift resource allocation, and the actual production rate are generated according to a pre-determined schedule.

The above description of the method and system for managing oilfield production with optimally allocating lift resource under a total lift resource constraint or a total produced gas (i.e., production) constraint being thus described, it will be obvious that the same may be varied in many ways. For example, the artificial lift may be based on mechanisms other than the gas lift. Such variations are not to be regarded as a departure from the spirit and scope of the claimed method or system or program storage device or computer program and all such modifications as would be obvious to one skilled in the art are intended to be included within the scope of the following claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying an optimum allocation of an applied resource throughout a well network, comprising:
   validating, according to a predefined schedule, well test data obtained from one or more wells of the well network by data conditioning and quality checking to generate validated well test data;
   updating, using a processor and according to the predefined schedule, a network model of the well network based on the validated well test data to generate an updated network model,
      wherein the well network comprises the one or more wells and a surface network,
      wherein the network model comprises static network parameters, the static network parameters comprising a boundary constraint at sources and sinks of the well network and a fluid composition in the one or more wells, and
      wherein the boundary constraint and the fluid composition are updated based on the validated well test data;
   updating, in response to a sensitivity analysis of a well test indicating a change in well performance, a well model comprised in the network model based on the validated well test data to generate an updated well model in the updated network model,
      wherein the sensitivity analysis is performed using the well model to predict a parameter value of the well test based on other parameters of the well test, and
      wherein the well model comprises a lift configuration of the one or more wells and a plurality of performance curves that relate well performance to one or more levels of the applied resource;
   diagnosing, according to the predefined schedule, the lift configuration of the one or more wells based on the validated well test data and the updated network model to generate a diagnosed lift configuration; and
   determining, using the processor and according to the predefined schedule, the optimum allocation of the applied resource using the updated network model based at least on the diagnosed lift configuration to maximize an operating parameter of the well network, including:
      converting a portion of the updated network model having a linear inequality relationship to a modified portion having a single variable and a linear equality constraint; and
      solving the modified portion using a modified Newton's method, wherein solving the modified portion using the modified Newton's method comprises determining one or more inverse derivative curves in order to solve a plurality of Karush-Kuhn-Tucker (KKT) conditions for optimality directly.

2. The method of claim 1, wherein determining the optimum allocation of the applied resource further includes:
   establishing an operating curve for each of the one or more wells based on at least one of the plurality of performance curves; and
   optimally allocating the applied resource among the one or more wells according to a constrained non-linear problem.

3. The method of claim 1, wherein determining the optimum allocation of the applied resource further includes:
   coupling an offline solution result with an online solution result.

4. The method of claim 1, wherein the linear equality constraint includes at least one of a total applied resource constraint or a total produced applied resource constraint.

5. The method of claim 1, wherein the one or more wells of the well network include at least one gas-lift well, and wherein determining the optimum allocation of the applied resource includes:
   determining an optimum allocation of a lift gas.

6. The method of claim 1, wherein the one or more wells of the well network include at least one electrically-driven well, and wherein determining the optimum allocation of the applied resource includes:
   determining an optimum allocation of at least one of an electrical power or an injected material.

7. The method of claim 1, wherein the one or more wells of the well network include one or more wells of a first type and one or more wells of a second type, and wherein determining the optimum allocation of the applied resource includes:
   determining a first optimum allocation of a first applied resource for the one or more wells of the first type; and
   determining a second optimum allocation of a second applied resource for the one or more wells of the second type.

8. One or more non-transitory computer-readable media containing computer-readable instructions that, when executed by a processor, perform a method comprising:
   validating, according to a predefined schedule, well test data obtained from one or more wells of a well network by data conditioning and quality checking to generate validated well test data;
   updating, according to the predefined schedule, a network model of the well network based on the validated well test data to generate an updated network model,
      wherein the well network comprises the one or more wells and a surface network,
      wherein the network model comprises static network parameters, the static network parameters comprising a boundary constraint at sources and sinks of the well network and a fluid composition in the one or more wells, and
      wherein the boundary constraint and the fluid composition are updated based on the validated well test data;
   updating, in response to a sensitivity analysis of a well test indicating a change in well performance, a well model comprised in the network model based on the validated well test data to generate an updated well model in the updated network model, wherein the sensitivity analysis is performed using the well model to predict a parameter value of the well test based on other parameters of the well test, and wherein the well model comprises a lift configuration of the one or more wells and a plurality of performance curves that relate performance of the one or more wells to one or more levels of an applied resource;

diagnosing, according to the predefined schedule, the lift configuration of the one or more wells based on the validated well test data and the updated network model to generate a diagnosed lift configuration; and computing, according to the predefined schedule, an optimum allocation of the applied resource using the updated network model based at least on the diagnosed lift configuration to maximize an operating characteristic of the well network, including:

converting a portion of the updated network model having a linear inequality relationship to a modified portion having a single variable and a linear equality constraint; and solving the modified portion to determine the optimum allocation of the applied resource using a modified Newton's method, wherein solving the modified portion using the modified Newton's method comprises: determining one or more inverse derivative curves in order to solve a plurality of Karush-Kuhn-Tucker (KKT) conditions for optimality directly.

9. The one or more computer-readable media of claim 8, wherein computing the optimum allocation of the applied resource further includes:

establishing an operating curve for each of the one or more wells based on at least one of the plurality of performance curves;

optimally allocating the applied resource among the one or more wells according to a constrained non-linear problem.

10. The one or more computer-readable media of claim 8, wherein computing the optimum allocation of the applied resource further includes:

coupling an offline solution result with an online solution result.

11. The one or more computer-readable media of claim 8, wherein the applied resource includes at least one of a lift gas, an electrical power, and an injection chemical.

12. A method for performing operations of an oilfield having at least one wellsite comprising:

obtaining a well model comprising a lift configuration of the at least one wellsite and a plurality of performance curves that relate well performance to one or more levels of a lift resource; and optimally allocating, using a processor, the lift resource to generate a lift resource allocation for the at least one wellsite to maximize a production rate at a sink, wherein optimally allocating the lift resource comprises:

converting a portion of the well model having a linear inequality relationship to a modified portion having a single variable and a linear equality constraint; and solving the modified portion using a modified Newton's method, wherein solving the modified portion using the modified Newton's method comprises determining one or more inverse derivative curves in order to solve a plurality of Karush-Kuhn-Tucker (KKT) conditions for optimality directly.

13. The method of claim 12, further comprising:

selectively performing, according to a predefined schedule, corrective action based on a diagnosis of the lift configuration, wherein diagnosing the lift configuration comprises:

verifying whether injection timing and injection pressure of a gas lift valve operates as configured; and verifying whether gas is being injected into a correct gas lift valve based on current operating conditions.

14. The method of claim 12, further comprising:

monitoring the production rate to generate an actual production rate; and generating an alarm upon the actual production rate deviating from a projected production rate to exceed a predetermined threshold, wherein the projected production rate is generated based on the diagnosis of the lift configuration and the lift resource allocation, wherein at least one selected from a group consisting of the diagnosis of the lift configuration, the lift resource allocation, and the actual production rate are generated according to a pre-determined schedule.

* * * * *